(12) United States Patent
Yamanaka et al.

(10) Patent No.: US 6,279,914 B1
(45) Date of Patent: *Aug. 28, 2001

(54) SEALING APPARATUS

(75) Inventors: Satoshi Yamanaka, Fukushima; Yasuhiro Ikeda, Souja; Shinobu Munekata, Fukushima, all of (JP)

(73) Assignee: Eagle Industry Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/177,490

(22) Filed: Oct. 23, 1998

(30) Foreign Application Priority Data

Oct. 24, 1997 (JP) .................................................. 9-309522
Oct. 21, 1998 (JP) .................................................. 10-318388

(51) Int. Cl.⁷ ...................................................... F16J 15/32
(52) U.S. Cl. ............................ 277/569; 277/394; 277/549
(58) Field of Search ....................................... 277/353, 370, 277/375, 384, 394, 402, 549, 551, 553, 562, 569, 571, 572

(56) References Cited

U.S. PATENT DOCUMENTS

| | | | |
|---|---|---|---|
| 4,755,115 | * 7/1988 | Akaike | 277/562 X |
| 5,056,799 | 10/1991 | Takenaka et al. | . |
| 5,183,271 | 2/1993 | Wada et al. | . |
| 5,213,343 | * 5/1993 | White, Jr. | 277/572 |
| 5,456,475 | * 10/1995 | Abraham et al. | 277/562 X |

FOREIGN PATENT DOCUMENTS 36 42 082 A1   6/1987 (DE) .
2 210 115      6/1989 (GB) .

* cited by examiner

*Primary Examiner*—Anthony Knight
*Assistant Examiner*—Karlena D. Schwing
(74) *Attorney, Agent, or Firm*—Armstrong, Westerman, Hattori, McLeland & Naughton, LLP.

(57) ABSTRACT

The present invention relates to a lip-type seal of the outer periphery rubber type having a stationary sealing portion made of rubber on the outer periphery of a reinforcing ring. In view of the fact that there is produced a gap corresponding to the rubber thickness of the stationary sealing portion between the outer periphery of the reinforcing ring and inner periphery of the seal attachment hole, the invention has an object to permit certain supporting of the reinforcing ring by means of a stop functional member by expanding the engagement area engaging with the stop functional member. More specifically, in the sealing apparatus of the invention, the engagement portion with the housing is sealed by a stationary sealing portion made of rubber attached to the outer periphery of the cylindrical portion of the reinforcing ring; the sliding portion with the shaft is sealed by sealing lips and supported by the reinforcing ring; and the reinforcing ring axially engages with the stop functional member such as a stop ring fixed to the inner periphery of the housing. In this sealing apparatus thus prevented from coming off, the reinforcing ring is provided with an engagement area expanding section which is arranged on the open-air side of the cylindrical portion, having a larger diameter than the cylindrical portion, arranged near the inner periphery of the housing, and expands the engagement area with the stop ring.

4 Claims, 9 Drawing Sheets

SEALING APPARATUS

BACKGROUND OF THE INVENTION

1. Field of the Invention

The present invention relates to a sealing apparatus applicable for a shaft sealing portion of various devices and appliances, particularly to a lip-type sealing apparatus provided with a sealing lip.

2. Description of the Related Art

There is conventionally known a lip-type seal in which a metal ring outer periphery is engaged with, and fixed to, the inner periphery of a housing, and a sealing lip supported by the metal ring slides in close contact with a shaft peripheral surface. In a lip-type sealing apparatus, it is the usual practice to cover the outer periphery of the metal ring with a stationary sealing portion made of a rubber-like elastic material so as to ensure sealing of a stationary portion over the shaft hole inner periphery of a housing.

When using a pressurized liquid for sealing, however, a stop ring is engaged with the shaft hole inner periphery of the housing, or when a bearing is arranged on the open-air side of the sealing apparatus, a bearing outer race is used for preventing coming-off.

When a stationary seal is not provided on the outer periphery of the metal ring, the open-air side end of the metal ring outer periphery certainly engages with the stop ring. When a stationary seal is provided on the metal ring outer periphery, however, there is usually produced a gap of about 1 mm between the metal ring outer periphery and the inner periphery of the sealing ring attachment hole of the housing, which reduces the size of an engagement margin with the stop ring, and this may make stopping unstable. In some cases, a deformation of the stop ring may cause inclination of the sealing apparatus, thus leading to a lower sealing property.

When coming-off is prevented by means of a bearing, it is necessary to achieve engagement with the outer race while avoiding interference with the inner race rotating with the shaft. However because there are diverse and various sizes of bearing, it may happen that the inside-diameter end position of the outer race is larger than the bore diameter of the seal attachment hole. It is therefore necessary to consider a stopper in response to a particular size of bearing.

SUMMARY OF THE INVENTION

The present invention has an object to provide a sealing apparatus of a type having a stationary sealing portion on the outer periphery of a metal ring, which ensures support by means of a stop functional member, and permits display of a satisfactory sealing property for a long period of time.

To achieve the above object, the present invention provides a sealing apparatus of a lip-type seal structure, which is fixed to one of relatively movable two members and is slidable in tight contact to another one of movable members, the sealing apparatus comprising:

a reinforcing ring, made of a rigid material, having a cylindrical portion, and fixed to the one of movable members;

a stationary sealing portion mounted to the reinforcing ring so as to seal a gap between the reinforcing ring and the one of movable members;

a sealing lip supported by the reinforcing ring to be slidable in contact to the other one of movable members;

a stopper member (stop functional member) fixed to the one of movable members for preventing the reinforcing ring from coming off through axial engagement with the stopper member, wherein the reinforcing ring is provided with an engagement area expanding section being arranged near the one of movable members and expanding an engagement area with the stopper member.

When a sealing apparatus, such as that of the present invention having the configuration as described above, is arranged closer to one member such as a housing than the cylindrical portion of the reinforcing ring, and the engagement area expanding section for expanding the engagement area with the stop functional member such as a stop ring is provided as a part of the reinforcing ring, the apparatus firmly engages with the stop functional member, thus permitting display of a stable stop function.

Particularly when a stop ring is used as a stop functional member, the position of the stopper acting point upon pressuring by the sealing liquid shifts to the side of one member side than that in the conventional art, and as a result, a relatively short distance between the action point and the fulcrum is set, leading to a relatively small moment acting on the stop ring, thus permitting effective prevention of deformation of the stop ring.

The engagement area is known also as the interference area, the contact region or the contact area, and can be expressed in terms of the radial length such as the engagement length, the interference length or the contact length.

In one aspect of a preferred embodiment, the stopper member is a stop ring to be engaged with an engagement groove formed to an open-air side end portion of a seal fitting hole on an inner periphery of a shaft hole of a housing as the one of movable members, and the reinforcing ring comprises a cylindrical portion to which the stationary sealing portion made of a rubber-like elastic material is applied, an engagement area expanding section, continuous to the open-air side end portion of the cylindrical portion, having a diameter larger than that of the cylindrical portion and being arranged near the inner periphery of the shaft hole, and an inward flange portion extending from the engagement area expanding section in a radially inward direction, the engagement area expanding section being positioned within the seal fitting hole and having a largest outer diameter smaller than a diameter of the seal fitting hole and larger than an inner diameter of the stop ring.

When the stop functional member is a stop ring as described above, the engagement area with the stop ring is expanded and certain stopper action can be ensured by expanding the engagement area expanding section over the diameter of the cylindrical portion within a range of bore diameter of the seal attachment hole.

Since the engagement area expanding section is provided at an open-air side end position on the outer periphery of the metal ring, the inward flange portion has a higher bending rigidity as compared with a case without an engagement area expanding section. As a result, the inward flange portion is harder to bend even under the action of a sealing pressure, thus backing up the sealing lip and maintaining the contact state of the sealing lip.

A large-diameter hole having a diameter larger than that of the seal fitting hole is formed on the inner periphery of the shaft hole of the housing on the open-air side of the seal fitting hole, a tapered hole which gradually diverges toward the open-air side and is continuous to the large-diameter hole is formed at the open-air side end portion of the seal fitting hole, and the engagement groove for the stop ring is formed at a boundary position between the open-air side end portion of the tapered hole and the large-diameter hole.

When a tapered hole is provided as described above, the stop ring has a slightly larger size, resulting in the inside-diameter end position of the stop ring somewhat shifting radially outside, whereas stopper action is ensured by the engagement area expanding section.

Further, the tapered hole guides the stationary sealing portion, and becomes easier to attach.

A claw extending from an inner-diameter end portion of the inward flange portion in an axial direction toward the axial open-air side is provided to the inner-diameter end portion of the reinforcing ring, and the claw has an end portion bent outward in a radial direction.

Provision of a claw makes it easier to withdraw the sealing apparatus. Upon withdrawal, a bending moment acts on the inward flange portion of the metal ring. However, because bending rigidity of the inward flange portion is improved by the engagement area expanding section, the inward flange portion becomes less susceptible to deformation.

The sealing lip is composed of a first sealing lip section which is provided on a first sealing member formed of a rubber-like elastic material to be integral with the reinforcing ring and a second sealing lip section which is provided on a second sealing member made of a resin which is assembled between the first sealing member and the inward flange portion of the reinforcing ring so as to support the open-air side surface of the first sealing lip section, the first sealing member being connected to the inner periphery of the cylindrical portion of the reinforcing ring and has a main body opposing to the inward flange portion, the first sealing lip section extending from the main body axially toward the sealing liquid side and having a lip leading end portion in contact to an outer periphery of the shaft in a sealed manner, the second sealing member having a flange portion held between a radial portion of the first sealing member and the inward flange portion of the reinforcing ring, and the second sealing lip section being inserted from the inner-diameter end portion of the flange portion into an annular space between the first sealing lip section and the outer peripheral surface of the shaft through a bent portion and having an inner periphery to be slidable in contact to the outer periphery of the shaft.

In the case of the composite type provided with the first and the second sealing lips as described above, in which the flange portion of the second sealing member is supported by the inward flange portion of the metal ring, deformation of the inward flange portion causes a shift of the second sealing lip of the second sealing member, and further, a change in the state of contact of the first sealing lip supported by the second sealing lip. It is therefore important to improve bending rigidity by providing an engagement area expanding section as described above.

An auxiliary metal ring is disposed between the second sealing member and the first sealing member, the auxiliary metal ring being provided with a support which is inserted between the first sealing lip section and the second sealing lip section so as to support the first sealing lip section.

According to this configuration, in which the sealing liquid pressure acting on the first sealing lip is supported by the auxiliary metal ring, deformation of the first sealing lip is more effectively prevented, even under a higher sealing liquid pressure, also because of the improved rigidity of the inward flange portion of the reinforcing ring, thus permitting maintenance of a proper contact state relative to the shaft.

In another aspect, the stopper member is an outer race of a bearing to be fitted to a seal fitting hole having a diameter larger than that of the seal fitting hole formed adjacent to the open-air side of the seal fitting hole of the one of movable member as a housing, and the reinforcing ring comprises a cylindrical portion to which the stationary sealing portion made of a rubber-like elastic material is applied, an engagement area expanding section, continuous to the open-air side end portion of the cylindrical portion, having a diameter larger than that of the cylindrical portion and being arranged near the inner periphery of the shaft hole, and an inward flange portion extending from the engagement area expanding section in a radially inward direction, the engagement area expanding section having a largest outer diameter smaller than a diameter of the seal fitting hole and larger than an inner diameter of the outer race of the bearing.

The engagement area expanding section has a portion formed so as to project from the open-air side end surface of the inward flange portion axially toward the open-air side.

In a further aspect, the stopper member is an outer race of a bearing to be fitted to a bearing fitting hole having a diameter larger than that of the seal fitting hole formed adjacent to the open-air side of the seal fitting hole of the one of movable member as a housing, and the reinforcing ring comprises a first cylindrical portion to which the stationary sealing portion made of a rubber-like elastic material is applied, an engagement area expanding section, continuous to the open-air side end portion of the first cylindrical portion, having a diameter larger than that of the first cylindrical portion and being arranged near the inner periphery of the seal fitting hole of the housing, a reversal portion which is reversed into a U-shaped cross-section axially toward the open-air side from the sealing liquid side end of the first cylindrical portion, a second cylindrical portion extending axially toward the open-air side with a predetermined distance from the first cylindrical portion through the reversal portion, and an inward flange portion extending from the open-air side end of the second cylindrical portion in a radial inward direction, and the engagement area expanding section has a largest diameter substantially equal to a diameter of the seal fitting hole and larger than an inner diameter of the outer race of the bearing.

When the first cylindrical portion is connected to the second cylindrical portion via the reversal portion, setting the diameter of the engagement area expanding section substantially equal to the diameter of the seal attachment hole causes no trouble for attachment because the first cylindrical portion is elastic, thus permitting maximum expansion of the engagement area in the seal attachment hole.

In a still further aspect, the stopper member is an outer race of a bearing to be fitted to a bearing fitting hole having a diameter larger than that of the seal fitting hole formed adjacent to the open-air side of the seal fitting hole of the one of movable member as a housing, and the reinforcing ring comprises a cylindrical portion to which the stationary sealing portion made of a rubber-like elastic material is applied, an inward flange portion extending inward in a radial direction from the open-air side end of the cylindrical portion, a reversal portion which is reversed into a U-shaped cross section axially outward from the inner-diameter end portion of the inward flange portion and an engagement area expanding section extending radially outward through the reversal portion, the engagement area expanding section having a largest outer diameter larger than a diameter of the seal fitting hole and larger than an inner diameter of the outer race of the bearing, and the engagement expanding section has an outer-diameter side end portion held between the sealing liquid side surface of the outer race and a boundary stepped portion of the seal fitting hole and the bearing fitting hole.

According to the configuration as described above, there is available a certain stopper function for the sealing apparatus even when the inside diameter of the outer race is larger than the bore diameter of the seal attachment hole.

In a still further aspect, the stopper member is an outer race of a bearing to be fitted to a bearing fitting hole having a diameter larger than that of the seal fitting hole formed adjacent to the open-air side of the seal fitting hole of the one of movable member as a housing, and the reinforcing ring comprises a first cylindrical portion to which the stationary sealing portion made of a rubber-like elastic material is applied, an engagement area expanding section extending outward in the radial direction from the open-air side end portion of the first cylindrical portion, a reversal portion which is reversed into a U-shaped cross-section axially toward the open-air side from the sealing liquid side end of the first cylindrical portion, a second cylindrical portion extending axially toward the open-air side with a predetermined distance from the first cylindrical portion through the reversal portion, and an inward flange portion extending from the open-air side end of the second cylindrical portion in a radial inward direction, and the engagement area expanding section has a largest diameter larger than a diameter of the seal fitting hole and larger than an inner diameter of the outer race of the bearing, and said engagement expanding section having an outer-diameter side end portion held between the sealing liquid side surface of the outer race and a boundary stepped portion of the seal fitting hole and the bearing fitting hole.

DESCRIPTION OF THE PREFERRED EMBODIMENTS

The present invention will now be described in detail.
First Embodiment

Figure 1:
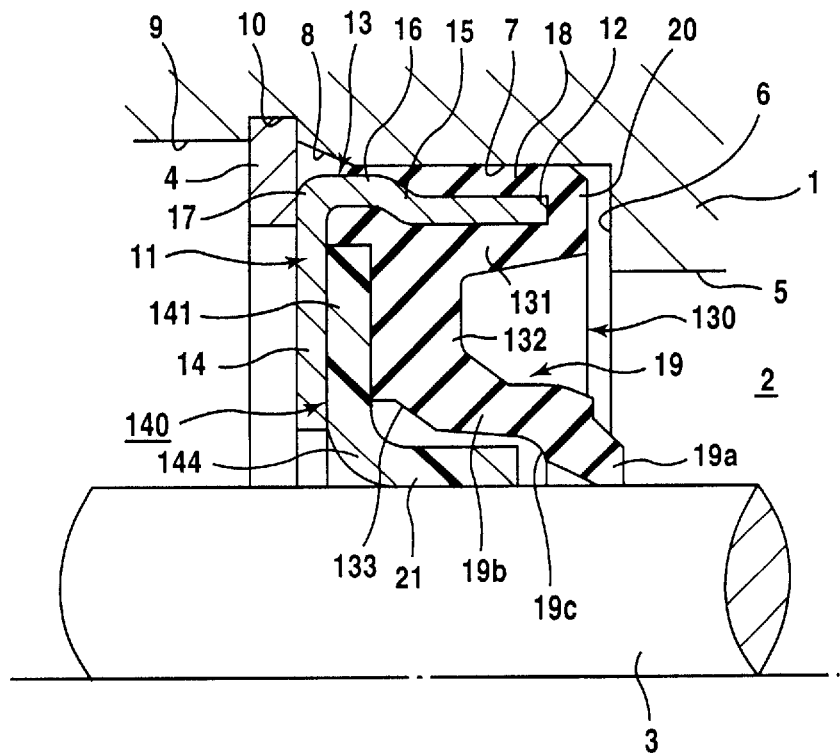
FIG. 1 is a half-cut sectional view illustrating attachment of a sealing apparatus of a first embodiment of the present invention.
Figure 3:
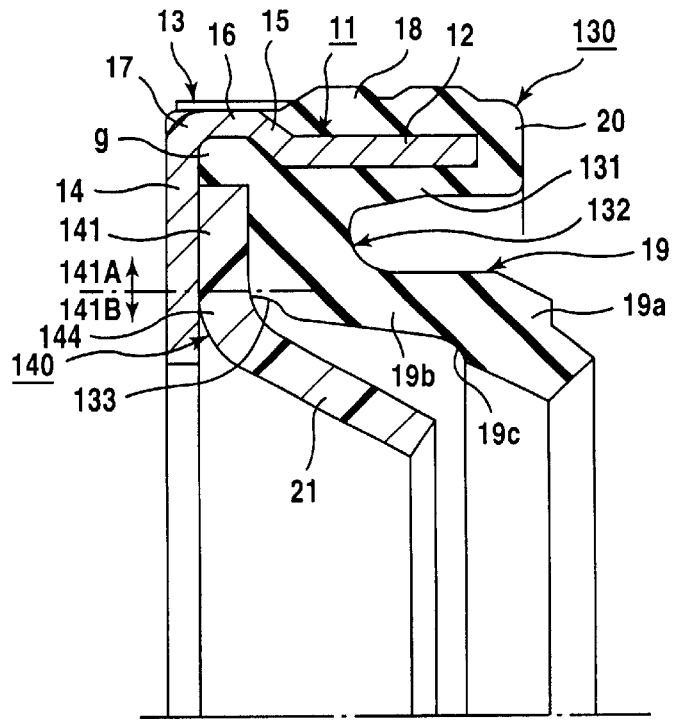
FIG. 3 is a half-cut sectional view illustrating the state prior to attachment of the apparatus shown in FIG. 1.

FIGS. 1 and 3 illustrate a first embodiment of the present invention. As shown in FIGS. 1 and 3, the lip-type seal serving as the sealing apparatus of this embodiment is inserted from the open-air side (also called the anti-sealing liquid side; left side in the drawing) into a shaft hole 2 of a housing 1 serving as one of relatively moving members, attached to the inner periphery of the shaft hole 2, and slides in close contact with a shaft 3 serving as the other of the relatively moving members, and coming-off in the axial direction is prevented by a stop ring 4 serving as a stop functional member.

The inner periphery of the shaft hole 2 of the housing 1 has a stepped cylindrical shape converging from the open-air side toward the apparatus interior into a smaller diameter, and has a small-diameter hole 5 presenting a relatively small-diameter cylindrical shape located deep in the apparatus; a stepped end face 6 extending from the open-air side end edge of this small-diameter hole 5 radially outward; a cylindrical seal attachment hole 7 having a larger diameter than the small-diameter hole 5, which extends from the outside-diameter end of the stepped end face 6 axially toward the open-air side and to which the lip-type seal is attached and fixed; a tapered hole 8 inclining so that the inside diameter gradually expands from the open-air side end edge of the seal attachment hole 7 further axially toward the open-air side; and a large-diameter hole 9 presenting a relatively large-diameter cylindrical shape, which extends from the open-air side end edge of the tapered hole 8 further toward the open-air side; these components being provided sequentially from the interior of the apparatus toward the open-air side. An attachment groove 10 for attaching a stop ring 4 is provided at the boundary between the tapered hole 8 and the large-diameter hole 9.

In FIGS. 1 and 3, the right hand of the lip-type seal is the sealing liquid side (also called the internal liquid side or the apparatus interior side), and the left hand is the open-air side. The stop ring 4 is made of a rigid material such as a metal, and is formed substantially into a C-shape as viewed in the axial direction to fully display the radial-direction spring force.

The sealing apparatus 1 has a reinforcing ring 11 made of a rigid material provided with a cylindrical portion 12 and fixed to the housing 1; a stationary sealing portion 18 made of a rubber-like elastic material, applied to the reinforcing ring 11 and sealing the gap between the reinforcing ring 11 and the inner periphery of the housing 1; a first sealing lip 19 made of a rubber-like elastic material, supported by the reinforcing ring 11 and slides in close contact with the shaft; and a second sealing lip 21 made of a resin.

The aforementioned stationary sealing portion 18 and the first sealing lip 19 are made of a rubber-like elastic material and formed integral with the reinforcing ring 11 to form together a first sealing member 130. The second sealing lip 21 made of a resin is held and fixed between the reinforcing ring 11 and the first sealing member 130, and serves as a second sealing member 140 made of a resin.

The reinforcing ring 11 is a metal ring such as a metal plate formed into substantially an L-shaped cross-section, attached to the inner periphery of the seal attachment hole 7 of the shaft hole 2 of the housing 1 via the stationary sealing portion 18 made of a rubber-like elastic material. The reinforcing ring 11 is substantially composed of a cylindrical portion 12 onto the outer periphery of which the stationary sealing portion 18 is attached; an engagement area expanding section 13 which is continuous to the open-air side end of the cylindrical portion 12, has a larger diameter than the cylindrical portion 12, is arranged near the inner periphery of the seal attachment hole 7 of the housing 1, and expands the engagement area with the stop ring 4; and an inward flange portion 14 extending from the engagement area expanding section 13 radially inward. These components are formed integrally in this order. The reinforcing ring 11 is formed by press forming including drawing and bending.

The engagement area expanding section 13 has a tapered portion 15 on the apparatus interior side, continuous to the above-mentioned cylindrical portion 12; a cylindrical portion 16 and a bend 17 on the open-air side, continuous to the inward flange portion 14, integrally formed in this order. The cylindrical portion 16 is a largest-diameter portion, continuous to the cylindrical portion 12 via the tapered portion 15 of which the diameter is reduced from the machine interior side (sealing liquid side) of the cylindrical portion 16 toward the sealing liquid. It is connected to the inward flange portion 14 via a bend 17 of substantially right angles. The engagement area expanding section 13 is positioned in the seal attachment hole 7 of the housing 1, and formed by extending, expanding or bending the open-air side end of the outer periphery of the reinforcing ring 11 axially outward, i.e., to the inner periphery side of the seal attachment hole 7 of the housing 1. The maximum diameter thereof is larger than the outside diameter of the cylindrical portion 12, and slightly smaller than the inside diameter of the seal attachment hole 7. It is furthermore set to a sufficiently larger value than the inside diameter of the stop ring 4 in the attached state with a view to expanding the axial engagement area with the stop ring 4.

The outside diameter of the cylindrical portion 12 is, as in the conventional art, smaller by a rank than the inside diameter of the seal attachment hole (a difference of larger than 1 mm as actually measured). The maximum outside diameter of the engagement area expanding section 13 is very slightly smaller than the inside diameter of the seal attachment hole (a difference of under 1 mm as actually measured). The inside diameter of the cylindrical portion 16 of the engagement area expanding section 13 is larger than the inside diameter of the stop ring 4 in the attached state.

The first sealing member 130 is an annular member made of a rubber-like elastic material formed into substantially a U-shape opening toward the sealing liquid side, and is composed of a stationary sealing portion 18 attached onto the outer periphery of the aforementioned cylindrical portion 12; an inner periphery rubber portion 131 attached to the inner periphery of the cylindrical portion 12 and the engagement area expanding section 13 and connected to the stationary sealing portion 18 via a connecting portion 20; a radial portion 132 which is a main body corresponding to a U-shaped base extending from the open-air side half of the inner periphery rubber portion 131 radially inward; and the aforesaid first sealing lip 19 extending from the inside-diameter end of the radial portion 132 axially toward the sealing liquid side (apparatus interior side) and having the leading end 19a thereof slidably in sealing contact with the shaft 3 surface.

The stationary sealing portion 18 covers the cylindrical portion 12, the tapered portion 15 of the engagement area expanding section 13, and a part of the outer periphery surface of the cylindrical portion 16 of the engagement area expanding section 13.

The inner periphery rubber portion 131 is vulcanization-bonded to the cylindrical portion 12, the tapered portion 15 of the engagement area expanding section 13 and the inner periphery of the cylindrical portion 16. More specifically, an annular gap is formed between the inner periphery of the cylindrical portion 16 and the outside-diameter end of the second sealing member 140, and the inner periphery rubber portion 131 penetrates also in this gap. The inner periphery rubber portion 131 is thus vulcanization-bonded to the inner peripheries of the cylindrical portion 16 and the bend 17 and the outside-diameter end of the sealing liquid side surface of the inward flange portion 14. The stationary sealing portion 18 and the first sealing lip 19 are thus connected to each other via the connecting portion 20, the inner periphery rubber portion 131 and the radial portion 132, and are vulcanization-formed integrally with the reinforcing ring 11 and the second sealing member 140. The radial size of the radial portion 132 is smaller than the inward flange portion 14 of the reinforcing ring 11, and the inside-diameter end of the radial portion 132 is located radially outward by a prescribed distance from the inside-diameter end of the inward flange portion 14.

The sealing liquid side surface of the first sealing lip 19 is connected to the sealing liquid side surface of the radial portion 132 via an arcuate corner portion, and the open-air side surface of the first sealing lip 19 forms a continuous surface with the inner peripheral surface of the radial portion 132.

On the other hand, an annular recess 133 is provided at an angle between the inner peripheral surface of the radial portion 132 and the open-air side surface so as to form a partial step from the inner peripheral surface of the radial portion 132. The angle between the recess 133 bottom surface and the inner peripheral surface of the radial portion 132 is formed into an arcuate shape.

The inner periphery of the lip leading end 19a is formed a triangular cross-section projecting radially inward, and the apex thereof is in contact with the entire peripheral surface of the shaft 3 and seals the same. A screw pumping portion such as a screw slot or a projection provided with a screw pumping function of transporting the liquid to the sealing liquid side by rotation sliding with the shaft 3 may be provided on the sliding surface of the lip leading end 19a of the first sealing lip 19, and on the slant on the open-air side beyond this apex. A spring ring for imparting tension may attached to the outer periphery of the lip leading end 19a.

On the other hand, the second sealing member 140 having the above-mentioned second sealing lip 21 is made of a resin material such as PTFE (tetrafluoroethylene) and has an interposed portion 141 which is a flange-shaped or collar-shaped flange held between the inward flange portion 14 of the reinforcing ring 11 and the radial portion 132 of the first sealing member 130, and a second sealing lip 21 which is folded from the inside-diameter end of the interposed portion 141 via the bend 144, and extends axially toward the sealing liquid side.

The thickness of the interposed portion 141 of the second sealing member 140 is substantially equal to the axial length of the cylindrical portion 16 of the engagement area expanding section 13 of the reinforcing ring 11, and an annular gap is formed between the outer periphery of the interposed portion 141 and the inner periphery of the cylindrical portion 16 of the engagement area expanding section 13.

The second sealing lip 21 is positioned in the annular gap between the open-air side surface of the first sealing lip 19 and the shaft 3, and the inner periphery thereof slidably in sealing contact with the shaft surface. The lip leading end of the second sealing lip 21 extends to the jaw 19c position of the lip leading end 19a of the first sealing lip 19. The second sealing lip 21 has a conical shape in which the diameter gradually becomes smaller axially toward the sealing liquid side in a free state. The conical portion having a diameter smaller than the outer periphery of the shaft 3 is expanded into a cylindrical shape along the shaft 3 surface upon insertion of the shaft 3. A contact surface pressure is obtained from the elastic restoring force thereof.

In the inserted state of the shaft 3, the sealing liquid side surface in contact with the outer peripheral surface of the second sealing lip 21 and the open-air side surface in contact with the inner periphery of the first sealing lip 19 are separated via the annular gap from each other so as to avoid mutual interference between the first sealing lip 19 and the second sealing lip 21. As a result, under a ordinary pressure of the sealing liquid, the first sealing lip 19 is allowed to deform freely within the range of the gap, thus permitting full display of an excellent follow-up property relative to eccentricity of the shaft 3.

It is needless to mention that, according as the sealing liquid pressure becomes higher, the foot portion 19b of the first sealing lip 19 deflects radially inward, and under a pressure of over a prescribed level, the gap is eliminated: the open-air side surface of the foot portion 19b of the first sealing lip 19 comes into contact with the open-air side surface of the second sealing lip 21 and the foot portion 19b of the first sealing lip 19 is supported by the second sealing lip 21 in sliding contact with the shaft 3, thus regulating an excessive deformation of the first sealing lip 19 and maintaining sealing property.

When regulating deformation of the first sealing lip 19, the portion of the second sealing lip 21 from the bend 144 located at the foot of the interposed portion 141 for a prescribed length supports the inner peripheral surface of the radial portion 132 of the first sealing member 130, and further, the leading end supports the foot 19b of the first sealing lip 19 of the sealing member 130.

A recess 133 is provided at an angle between the inner peripheral surface and the open-air side surface of the radial portion 132 of the first sealing member 130. Because this recess 133 is opposite to the bend 144 of the second sealing member 140, a gap corresponding to the recess 133 is formed between the bend 144 and the radial portion 132 even when the first sealing lip 19 and the radial portion 132 deformed under pressure of the sealing liquid come into contact with the second sealing lip 21. The second sealing lip 21 largely bends from the foot of the bend 144 by the utilization of this gap, and follow-up property is improved in terms of eccentricity or axial displacement of the shaft 3, and of course, in terms of swinging thereof.

The interposed portion 141 of the second sealing member 140 opposes to the inner peripheral surface of the cylindrical portion 16 of the reinforcing ring 11 with a prescribed annular gap in between, and this annular gap is filled with the rubber-like elastic material of the first sealing member 130. The axial length of the cylindrical portion 16 of the reinforcing ring 11 is substantially equal to the thickness of the interposed portion 141 of the second sealing member 140.

The interposed portion 141 of the second sealing member 140 is bonded and fixed to the radial portion 132 of the first sealing member 130. The outside-diameter side is bonded and fixed to the inward flange portion 14 of the reinforcing ring 11, and the bend 144 on the inside-diameter side is not bonded and made separable.

Figure 4:
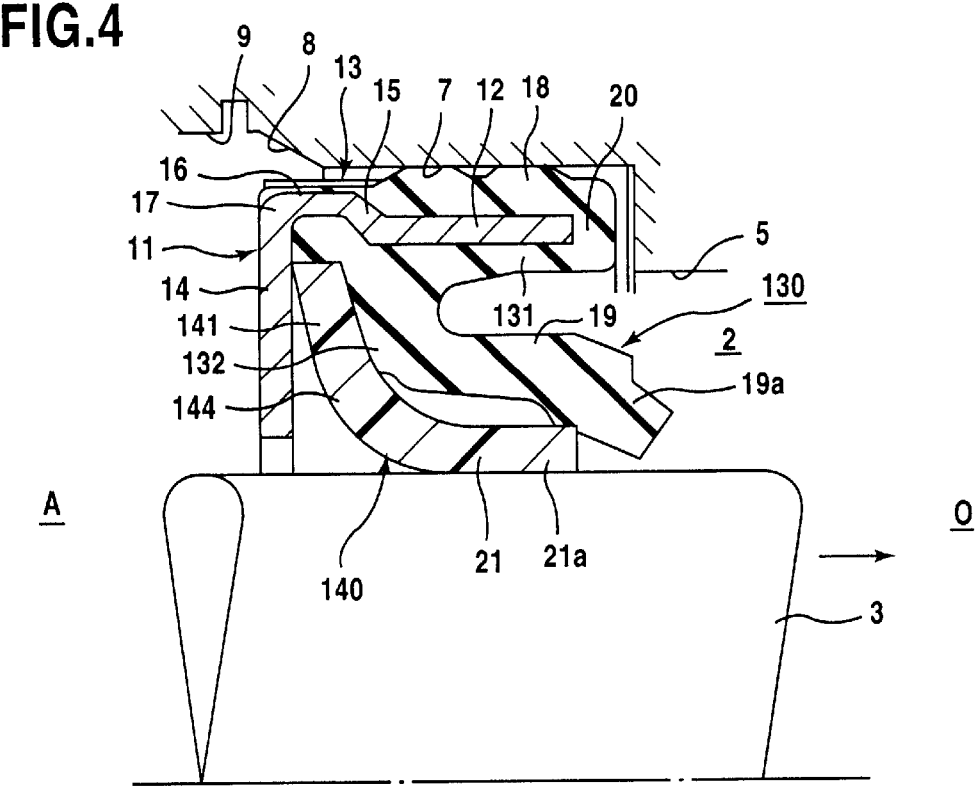
FIG. 4 is a partial sectional view illustrating in an exaggerated form a defective attachment of shaft in the case where the interposed portion of the second sealing member and the inward flange portion of the reinforcing ring of the apparatus shown in FIG. 1 are not bonded.

When the sealing liquid side 0 surface of the inward flange portion 14 of the reinforcing ring 11 is not bonded to the open-air side A surface of the interposed portion 141 of the second sealing member 140, as shown in FIG. 4, contact frictions with the shaft 3 upon insertion of the shaft 3 pull the second sealing lip 21 axially to the sealing liquid side 0 and is deformed so that the inside-diameter end of the interposed portion 141 project axially to the sealing liquid side with the outside-diameter end as the fulcrum. As a result of this deformation of the interposed portion 141, the inside-diameter end of the radial portion 132 of the first sealing member 130 made of a rubber-like elastic material deforms axially to the sealing liquid side 0, and the lip leading end 21a of the second sealing lip 21 enters the space between the lip leading end 19a of the first sealing lip 19 and the shaft 3. The lip leading end 19a of the first sealing lip 19 floats up, producing a gap from the shaft 3, and this may cause a decrease in sealing property.

The interposed portion 141 of the second sealing member. 140 is therefore bonded and fixed also to the inward flange portion 14 of the reinforcing ring 11.

The boundary P1 between the bonded area 41A and the non-bonded area 41B of the second sealing member 140 to the inward flange portion 14 of the reinforcing ring 11 is aligned with the inside-diameter end position P2 of the bonded area of the radial portion 132 of the first sealing member 130 to the interposed portion 141 (as shown in FIG. 3). This bonded area corresponds to an area to which the vulcanization forming pressure of the first sealing member 130 is applied, upon mold forming, to the inward flange portion 14 of the reinforcing ring 11 via the resin plate 140A composing the second sealing member 140 as described later.

When the boundary P1 of the bonded area between the second sealing member 140 to inward flange portion 14 of the reinforcing ring 11 is positioned on the outside-diameter side from the inside-diameter end position P2 of the bonded area of the radial portion 132 of the first sealing member 130 to the interposed portion 141 of the second sealing member 140, a gap is more easily formed between the interposed portion 141 of the second sealing member 140 and the inward flange portion 14 of the reinforcing ring 11 upon attaching the shaft 3.

On the other hand, when the boundary P1 of the bonded area of the interposed portion 141 of the second sealing member 140 to the inward flange portion 14 of the reinforcing ring 11 is positioned on the inside-diameter side from the inside-diameter end position P2 of the bonded area of the radial portion 132 of the first sealing member 130 to the interposed portion 141 of the second sealing member 140, a gap is more hardly produced between the interposed portion 141 of the second sealing member 140 and the inward flange portion 14 of the reinforcing ring 11 upon attaching the shaft 3, by leads to a poorer eccentricity follow-up property of the second sealing lip 21 relative to shaft eccentricity of the shaft 3.

The inside-diameter end position P1 of the bonded area of the interposed portion 141 of the second sealing member 140 to the inward flange portion 14 of the reinforcing ring 11 should preferably be substantially in agreement with the inside-diameter end position P2 of the bonded area of the radial portion 132 of the first sealing member 130 to the interposed portion 141 of the second sealing member 140. As a result of such agreement, the vulcanization-forming pressure of the forming material of the rubber-like elastic material acts on the entire bonded surface upon mold forming, thus ensuring satisfactory bending.

A second screw pumping section such as a spiral groove having a screw pumping function for transporting the liquid between the sliding surfaces to the sealing liquid side by rotation sliding with the shaft 3 may be provided on the sliding surface of the second sealing lip 21 with the shaft 3, or an annular groove may be provided to improve sealing property.

Assembly of the sealing apparatus into the housing shaft hole 2 is accomplished by inserting the same from the large-diameter hole 9 located on the open-air side of the shaft hole 2 axially toward the sealing liquid side and pressure-inserting the same in to the seal attachment hole 7. Because a tapered hole 8 is provided on the entry side of the seal attachment hole 7, the stationary sealing portion 18 on the outer periphery of the reinforcing ring 11 is guided by the tapered hole 8, and this ensures smooth insertion into the seal attachment hole 7. Upon completion of pressure-insertion of the sealing apparatus, coming-off is prevented by fitting the stop ring 4 such as a C-ring into the attachment groove 10.

The aforementioned sealing apparatus is to seal the sealing liquid (not shown) at the top right in the drawing: the housing 1 side is sealed by the stationary sealing portion 18 on the outer periphery of the cylindrical portion 12 of the reinforcing ring 11, and the movable shaft 3 side is sealed by the first and the second sealing lips 19 and 21.

Since the foot portion 19b of the first sealing lip 19 is supported by the leading end of the second sealing lip 21, the first sealing lip 19 is prevented from being turned over, thus maintaining stable sealing property.

Since the interposed portion 141 of the second sealing member 140 is bonded and fixed to the inward flange portion 14 of the reinforcing ring 11, rotation of the second sealing member 140 can be prevented. Further, the interposed portion 141 of the second sealing member is never separated from the open-air side surface of the inward flange portion 14 of the reinforcing ring 11 by frictions upon inserting the shaft 3, and the first sealing lip 19b never floats up.

Because only the outside-diameter side of the interposed portion 141 is bonded and fixed to the inward flange portion 14, and the bend 144 on the inside-diameter side is not bonded, it is possible to improve eccentricity follow-up property of the second sealing member 140 by causing deformation not only of the second sealing lip of the second sealing member 140 but also of the inside-diameter side of the interposed portion 141 upon eccentricity of the shaft 3, thus permitting improvement of sealing property of the sealing apparatus.

The engagement area expanding section 13 extending to the housing 1 side as described above, and substantially expanding the axial engagement area with the stop ring 4 is provided integrally with the reinforcing ring 11 as a part thereof. This ensured certain engagement and permits full display of stable stopper function.

Particularly when the housing 1 has a tapered hole 8 and the stop ring 4 is attached to the large-diameter portion 9, as in this embodiment, the stop ring 4 would have a larger size, although the inside-diameter end position somewhat shifts radially outside, and the engagement area expanding section 13 ensures certain stopper function.

Figure 2:
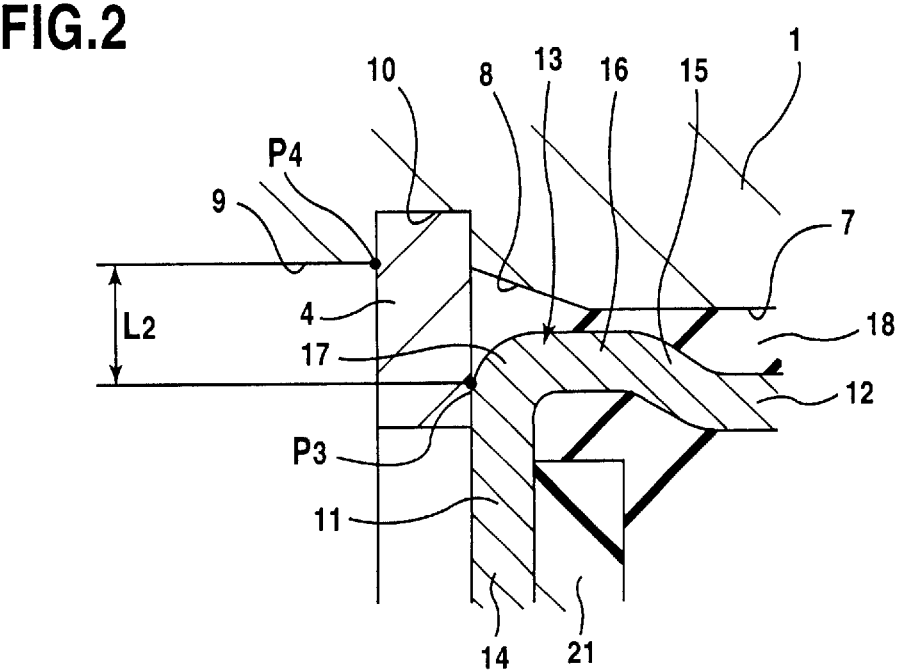
FIG. 2 is a partially enlarged view of FIG. 1.

The action point position upon pressurizing with the sealing liquid is change radially outside than that in the conventional art, i.e., on the housing 1 side, resulting in a shorter distance L2 between the action point P3 and the fulcrum P4 (as shown in FIG. 2).

This leads to a relatively smaller bending moment caused by the sealing liquid acting on the stop ring 4 via the aforementioned sealing apparatus. It is thus possible to effectively prevent deformation of the stop ring 4. It is therefore possible to prevent inclination of the sealing apparatus caused by deformation of the stop ring 4 even under a larger pressure of the sealing liquid, permitting display of an excellent sealing property for a larger period of time. While the reinforcing ring 11 including the engagement area expanding section 13 directly engages with the stop ring, this engagement may be made via a buffer material such as a rubber film (not shown).

Because the engagement area expanding section 13 is provided at the open-air side end position on the outer periphery of the reinforcing ring 11 so as to project radially, the inward flange portion 14 has a higher bending rigidity as compared with a case without an engagement are expanding section 13. Even under action of the sealing pressure, therefore, the inward flange portion 14 is hardly bent, can maintain appropriate contact state of the sealing lips, and permits further improvement of sealing property, together with the deformation preventing function of the stop ring 4.

In the composite type provided with the first and the second sealing lips 19 and 21 as in the present embodiment, the interposed portion 141 of the second sealing member 140 is supported by the inward flange portion 14 of the reinforcing ring 11. Deformation of the inward flange portion 14 therefore causes shifting of the second sealing lip 21 of the second sealing member 140, and further causes a change in the contact state of the first sealing lip 19 supported by the second sealing lip 21. It is therefore important to improve bending rigidity by providing such as engagement area expanding section 13.

A manufacturing method of the sealing apparatus of the above-mentioned embodiment will now be described with reference of FIGS. 5 and 6.

In the manufacture of the sealing apparatus, the flat washer-shaped resin plate 140A serving as the second sealing member 140 and the reinforcing ring 11 are previously fabricated on a preliminary parts level. The reinforcing ring 11 is formed through press forming including drawing and bending. The resin plate 140A is formed by punching a resin sheet of PTFE, for example, or cutting the end face of a thick cylindrical resin raw material into a flat washer-shaped plate having a prescribed thickness.

The forming process of the reinforcing ring 11 and the resin plate 140A is carried out through steps of inserting the reinforcing ring 11 and the resin plate 140A into a forming mold 391, conducting a process known as insert-forming of forming an intermediate form by forming integrally with the first sealing member 130, and then, bending the resin plate 140A, which is the stripped intermediate form, thus forming the second sealing lip 21. The intermediate form means the state prior to bending of the second sealing lip 21 of the second sealing member 140, in which inside-diameter side half of the flat washer-shaped resin plate 140A forming the second sealing member 140 extends radially.

Figure 5:
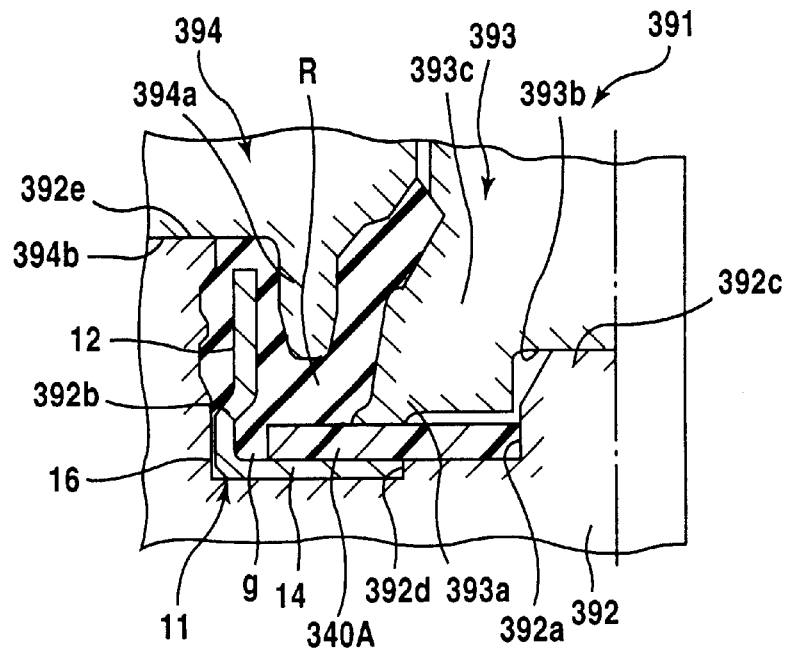
FIG. 5 is a partial sectional view illustrating forming of an intermediate form of the apparatus shown in FIG. 1.

The forming mold 391 for the intermediate form in the present invention has a lower die 392 serving as a first mold component, a first upper die 393 serving as a second mold component, and a second upper die 394 serving as a third mold component as shown in FIG. 5.

The lower die 392 is provided with a circular recess 392b into which the reinforcing ring 11 and the flat washer-shaped resin plate 140A are inserted; a center projection projecting at the bottom center of the recess 392b and having a cylindrical guide 392a which guides the inner periphery of the resin plate 140A and thus serves as a positioning reference for carrying out radial positioning thereof, and an annular step 392d protruding from the bottom surface of the recess around the guide 392a on the bottom of the recess and with which the inner periphery of the inward flange portion 14 of the reinforcing ring 11. The guide 392a is provided on the outer periphery of the lower end of the center projection 392c. The portion on top of the guide 392a of the center projection 392c takes a frustoconical shape converging gradually upward into a smaller diameter to ensure easy insertion of the resin plate 140A.

The annular step 392d has a height agreeing with the thickness of the inward flange portion 14 so that, upon engagement with reinforcing ring 11, the inward flange portion 14 and the annular step 392d are flush with each other. The resin plate 140A is placed on substantially the flat surface formed by the inward flange portion 14 of the reinforcing ring 11 and the annular step 392d, and the resin plate 140A is radially positioned through engagement of the inner periphery thereof with the outer periphery of the guide 392a of the center projection 392c.

In the state in which the reinforcing ring 11 and the resin plate 140A are positioned in the lower die 392, on the other hand, an annular gap g is formed between the outside-diameter end 141c of the resin plate 140A and the inner peripheral surface of the cylindrical portion 16 of the reinforcing ring 11 so as not to impair positioning of the resin plate 140A relative to the guide 392a.

When setting the resin plate 140A in the lower die 392, positioning may be conducted by engaging the peripheral surface of the outside-diameter end of the resin plate 140A with the inner periphery of the cylindrical portion 321 of the reinforcing ring 11. The inside diameter and thickness of the resin plate 140A are important properties for determining the supporting position for preventing tension and deformation of the first sealing lip 19 caused upon sliding of the second sealing lip 21 with the shaft 3, and are controlled with strict size tolerances.

In order to perform positioning of the inside-diameter end of the resin plate 140A by means of the outside-diameter end of the resin plate 140A, it is necessary to fabricate the outside-diameter end surface of the resin plate 140A under a strict size control. It is also necessary to accurately position the reinforcing ring 11 serving as an attachment reference of the resin plate 140A relative to the lower die 392, and to conduct high-accuracy engagement of the inside-diameter end of the inward flange portion 14 of the reinforcing ring 11 with the annular step 392d of the lower die.

However, engagement of the inward flange portion 14 of the reinforcing ring 11 and the annular step 392d is a metal-to-metal one. The annular step 392d is therefore susceptible to wear, and failure to apply a proper size control may cause occurrence of eccentricity of the reinforcing ring 11 and resultant eccentricity of the second sealing lip 21, and may cause a decrease in sealing property.

In this respect, by positioning relative to the forming mold 392 with reference to inside-diameter end of the resin plate 140A, it is not necessary to apply a high-accuracy fabrication of the outside-diameter end of the resin plate 140A, and it suffices to conduct fabrication only for the inside diameter and the thickness, which are important parameters, thus permitting reduction of the number of steps.

Because the reinforcing ring 11 is not used as a reference for positioning the resin plate 140A, it is possible to use a lower positioning accuracy for the reinforcing ring 11 itself, allow wear caused by metal-to-metal engagement between the reinforcing ring 11 and the annular step 392d of the lower die 392 within a certain range, and sometimes to omit a portion of maintenance and quality control steps of the forming mold 391.

It is thus possible to facilitate fabrication of the second sealing member 140, achieve a highly accurate assembly of the second sealing member 140 in the forming process, and improve the step. There is therefore available a sealing apparatus capable of displaying a satisfactory sealing property.

The first upper die 393 is inserted into the recess 392b of the lower die 392. An annular pressing surface 393a pressing the resin plate 140A on the inward flange portion 14 of the reinforcing ring 11 placed on the bottom of the recess 392b is provided at the lower end of this inserted portion 393c, and a first sealing lip open-air side surface forming the open-air side surface of the first sealing lip 19 of the first sealing member 130 are provided. More specifically, a hole 393b for inserting the top end of the center projection 392c of the aforementioned lower die 392 is provided on the lower end surface of the first upper die 393. The aforesaid pressing surface 393a is provided at the lower end outside-diameter end of the inserted portion 393c so as to surround this hole 392b.

The second upper die 394 has an annular convex portion 394a inserted into the recess 392b of the lower die 392 and forming the radial portion of the first sealing member 130 and the sealing liquid side surface of the first sealing lip 19. This second upper die 394 is a ring member at the center of which the aforesaid first upper die 393 is assembled. The lower end surface 394b radially outside the annular convex portion 394a serves as a dividing plane hitting a flat surface 392e surrounding the recess 392b of the lower die 392.

The intermediate form is formed by placing the reinforcing ring 11 with the inward flange portion 14 downward into the opened lower die 392, inserting the resin plate 140A formed into a flat washer shape via an adhesive onto the inward flange portion 14, and charging a rubber-like elastic raw material R.

Then, the first upper die 393 is closed. The resin plate 140A is pressed with the pressing surface thereof, and swishing is performed on the boundary between the outside-diameter side half and the inside-diameter side half of the resin plate 140A. In this state, the second upper die 394 is closed at a prescribed speed, and the entire forming mold 391 is heated to fluidize the rubber raw material R. The entire cavity is filled with the raw material rubber by pressing the same under the closing pressure. Thus, simultaneously with forming of the first sealing member 130, the outside-diameter side half of the resin plate 140A and the inward flange portion 14 of the reinforcing ring 11 are bonded and fixed, thereby forming the intermediate form.

The radial portion 132 of the first sealing member 130 made of a rubber-like elastic material and the resin plate 140A are bonded during the mold forming stage without coating an adhesive. An adhesive may however be coated onto the bonded area of the resin plate 140A.

For the contact surface between the inward flange portion 14 of the reinforcing ring 11 and the interposed portion 141 of the second sealing member 140, only the area subjected to the forming pressure of the raw material rubber R, i.e., only the area radially outside the pressing surface 393a of the first upper die 393, subjected to the action of the vulcanization forming pressure via the resin plate 140A is fixed by bonding. The area not subjected to the vulcanization forming pressure, radially inside the area including the pressing surface 393a is left unbonded.

Upon completion of insert-forming, the forming mold is opened to strip off the formed product, and then, the first sealing lip 19 of the first sealing member 130 is fabricated (for example, single-surface cut or double-surface cut along the cut line in the drawing), and at the same time, the inside-diameter side half of the resin plate 140A is bent by means of a bending forming apparatus, thereby forming the second sealing lip 21.

Figure 6:
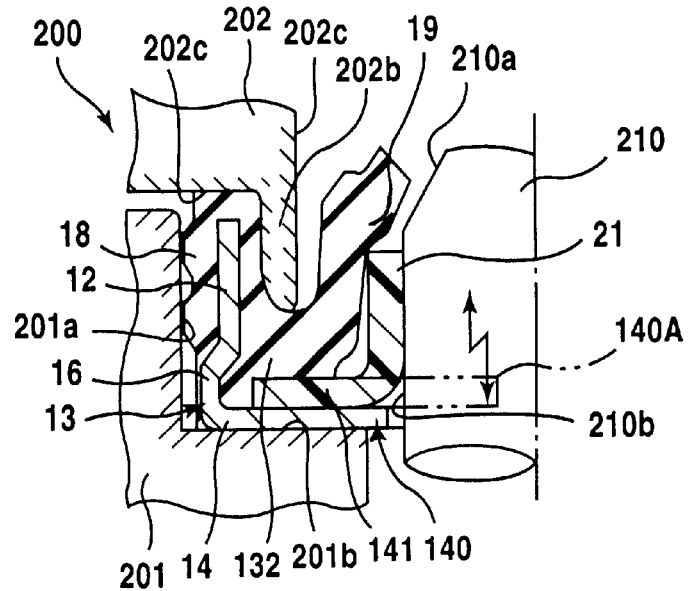
FIG. 6 is a partial longitudinal sectional view illustrating the bending process of a resin plate from the intermediate form formed in FIG. 5.

The bending fabrication is carried out by means of a bending forming apparatus as shown in FIG. 6.

The intermediate form before bending is fixed by means of an annular fixing jig 200 while exposing the first sealing lip 19 and the inside-diameter half of the resin plate 140A toward inside. The intermediate form is bent into a cylindrical shape while expanding the diameter of the inside-diameter side half of the resin plate 140A by inserting a rod-shaped forming jig 210 having a tapered surface 210a into the fixing jig 200.

The fixing jig 200 is capable of pressure-bonding and separable, and has first and second fixing rings 201 and 202 for fixing the first sealing lip 19 and the inside-diameter half of that in the exposed state.

An annular step 201b having an L-shaped cross-section is provided on the upper edge of the inside-diameter end of the first fixing ring 201. The inward flange portion 14 of the reinforcing ring 11 of the intermediate form is place on this annular step 201b, and the outer periphery rubber 18 of the first sealing member 130 is engaged with the inner peripheral wall 201a surrounding the annular step 201b. On the other hand, the second fixing ring 202 has a pressing surface 202a which comes into contact with the leading end of the cylindrical portion 12 of the first sealing member 130 and holds the intermediate form between the same and the annular step 201b of the first fixing ring 201, and an annular holding projection 202b which projects from the inside-diameter end into a cylindrical shape for engagement with the inner periphery of the cylindrical portion 12 of the first sealing member 130 and holds down the radial portion 132. In a state in which the intermediate form is fixed with the fixing jig 200, the first:sealing lip 19 is housed in a center hole 202c of the second fixing ring 202.

On the other hand, the forming jig 210 is composed of a round rod having substantially the same diameter as the shaft 3. The forming jig 210 is axially and relatively movably assembled with the fixing jig 200 and has at the leading end thereof a tapered portion 210a which is pressure-inserted into the center hole and bends it gradually in the axial direction while expanding the bore of the inside-diameter side half of the resin plate 140A.

The resin plate 140A is bent by pressure-inserting the forming jig 210 with the tapered portion 210a as the leading end axially into the center hole of the resin plate 140A, and axially bending it while gradually expanding the bore end of the resin plate 140A along the shape of the tapered portion 210a, thereby forming the second sealing lip 21. At this point, a force pulling in the inserting direction of the forming jig 210 acts on the outside-diameter side half (the interposed portion 141 of the second sealing member 140) of the resin plate 140A held between the inward flange portion 14 of the reinforcing ring 11 and the radial portion 132 of the first sealing member 130. Deformation of the outside-diameter half of the resin plate 140A is however prevented because it is bonded to the inward flange portion 14 on the outside-diameter side of the resin plate 140A, and further, held down via the radial portion 132 by the holding projection 202b of the second fixing ring 202.

After thus bending the second sealing lip 21, the forming jig 210 is removed axially in the reverse direction, and the finished product of the sealing apparatus is taken out by separating the first and the second fixing rings 201 and 202 from each other.

Second Embodiment

Figure 7:
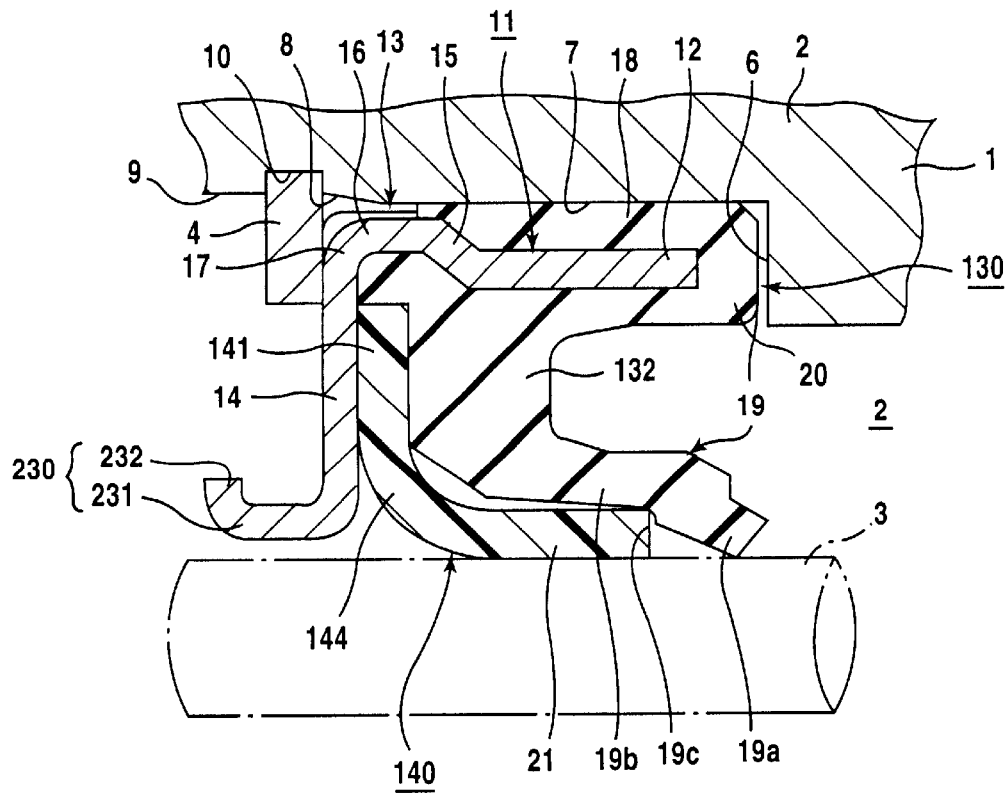
FIG. 7 is a half-cut sectional view illustrating attachment of a sealing apparatus of a second embodiment of the invention.
Figure 8:
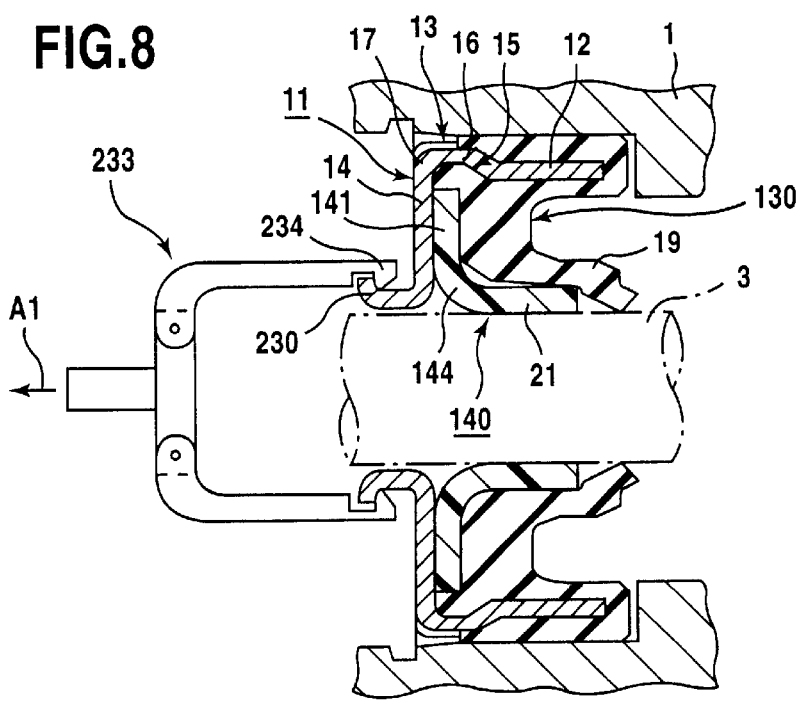
FIG. 8 is a descriptive view of the state of withdrawal of the apparatus shown in FIG. 7.

FIGS. 7 and 8 illustrate a second embodiment of the present invention.

In the second embodiment, a claw 230 extending from the inside-diameter end toward the open-air side and bent outward is provided on the inward flange portion 14 of the reinforcing ring 11 of the first embodiment. The same components as in the first embodiment are assigned the same reference numerals, and description thereof is omitted here.

The claw 230 in this embodiment is composed of a cylindrical portion 231 having an inside diameter substantially equal to the inside diameter of the inward flange portion 14, and an outward flange portion 232 bent outward from the open-air side end of the cylindrical portion 231.

Assembly of the sealing apparatus is accomplished by inserting the sealing apparatus from the open-air side of a shaft hole 2 toward the sealing liquid side so that the sealing liquid side end of the cylindrical portion 12 of the reinforcing ring 11 hits via a connecting portion 20 a stepped end face 6 at the depth of a sealing attachment hole 7 of a shaft hole 2 (there is actually a gap from the stepped end face 6), and fitting a stop ring 4 such as a C-ring into an attachment groove 10.

Withdrawal of the sealing apparatus from the shaft hole 2 can be easily conducted by, as shown in FIG. 8, removing the stop ring 4, and then pulling out the claw 230 provided on the inward flange portion 14 of the reinforcing ring 11 in the A1 direction by holding the claw 230 between claws 234 of the pulling jig 233.

A bending moment acts onto the inward flange portion 14 of the reinforcing ring 11 upon withdrawal. However, because bending rigidity of the inward flange portion 14 is improved by the engagement area expanding section 13, the inward flange portion 14 is hardly susceptible to deformation.

There may be adopted a configuration formed by notching the outward flange portion 232 of the claw 230, inserting a claw 234 of a removing jig 233 into the notch, and rotating the removing jig 233 by a prescribed angle, thereby engaging the claw 234 with the unnotched portion of the outward flange portion 232.

Third Embodiment

Figure 9:
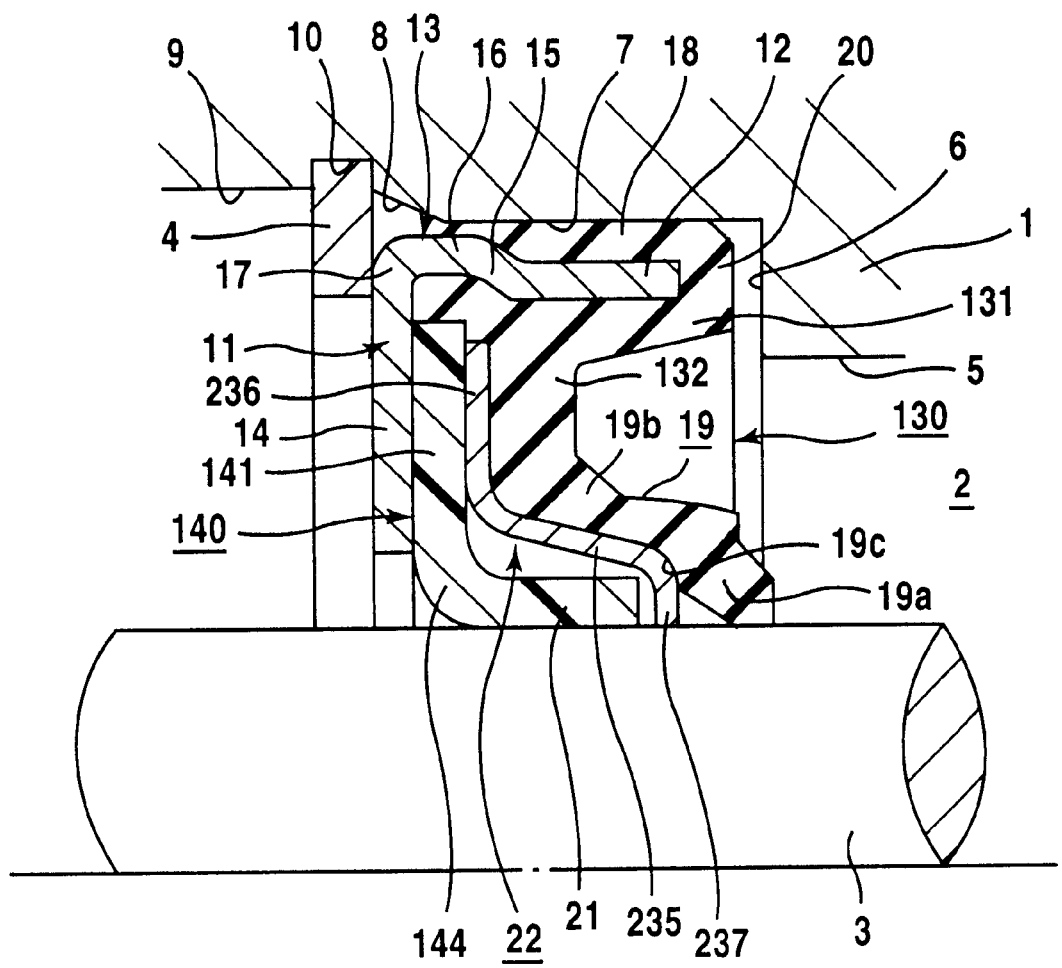
FIG. 9 is a half-cut sectional view illustrating the state of attachment of a sealing apparatus of a third embodiment of the invention.

FIG. 9 illustrates a sealing apparatus of a third embodiment of the invention.

In the third embodiment, a pressure-resistant auxiliary metal ring 22 is provided between a first sealing lip 19 and a second sealing lip 21 on the back of a first sealing lip 19, with a view to preventing an excessive deformation of the first sealing lip 19 under the effect of the sealing liquid pressure.

The auxiliary metal ring 22 has a tapered cylinder 235 composing a support extending along the first sealing member 19; a fixed flange portion 236 which is provided at the larger-diameter end of the tapered cylinder 235, bonded and fixed along the open-air side surface of the radial portion 132 of the first sealing member 130; and an inward bend 237 which is provided at the smaller-diameter end of the tapered cylinder 235 and is bent along a jaw portion 19c of the first sealing lip 19. The tapered cylinder 235 is arranged so as to support a foot portion 19b of the first sealing lip, and the inward flange portion is arranged so as to project radially inward (on the shaft 3 side) the jaw portion 19c of the lip leading end 19a.

Even when the sealing liquid is under a high pressure, therefor, it is possible to prevent the first sealing lip 19 from being turned over.

Since the sealing liquid pressure acting on the first sealing lip 19 is supported by the auxiliary metal ring 22, it is possible, even under a higher sealing liquid pressure, to more effectively prevent deformation of the first sealing lip 19 and maintain an appropriate contact state with the shaft, together with improved rigidity of the inward flange portion 14 of the reinforcing ring 11.

Because the other configuration and operations are quite the same as in the first embodiment, the same components as in the first embodiment are assigned the same reference numerals, and description thereof is omitted here.

Fourth Embodiment

Figure 10:
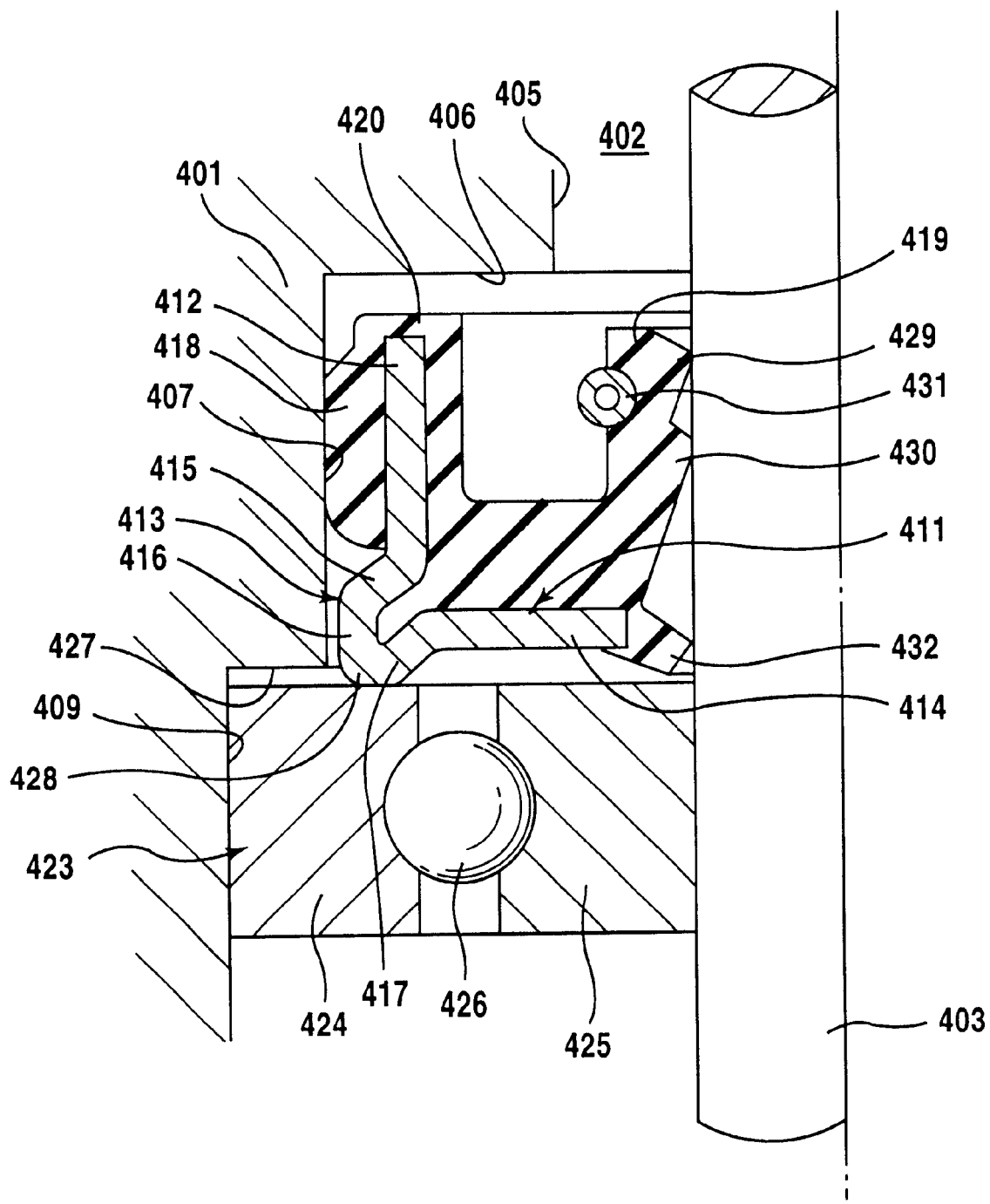
FIG. 10 is a half-cut sectional view illustrating the state of attachment of a sealing apparatus of a fourth embodiment of the invention.

FIG. 10 illustrates a sealing apparatus of a fourth embodiment of the present invention.

The sealing apparatus of this embodiment is an oscillating seal for power steering, which is inserted into a shaft hole 402 of a housing 401 serving as one of relatively moving members from the open-air side (also called the anti-sealing liquid side; top and bottom in FIG. 10), attached to the inner periphery of the shaft hole 402, and slides in close contact with the peripheral surface of a shaft 403 serving as the other of the relatively moving members. Prevention of the coming-off in the axial direction, holding or retaining is accomplished by an outer race of a bearing 423 serving as a stop functional member. In FIG. 10, the top of the sealing apparatus is the sealing liquid side (also called the internal liquid side or the apparatus interior side), and the bottom is the open-air side.

The inner periphery of the shaft hole 402 of the housing 401 has a stepped cylindrical shape, of which the diameter becomes smaller from the open-air side toward the apparatus interior, and has a small-diameter hole 405 located deep in the apparatus and presenting a cylindrical shape of a relatively small diameter; a step end face 406 extending from the open-air side end edge of the small-diameter hole 405 radially outward; a cylindrical seal attachment hole 407, having a larger diameter than the small-diameter hole, and extending from the outside-diameter end of the stepped end face 406 axially toward the open-air side, to which the lip type seal is attached and fixed; a stepped end face 427 extending from the open-air side end edge of the seal attachment hole 407 radially outward; and a bearing attachment hole 409 which extends further from the large-diameter end of the stepped end face 427 axially to the open-air side, and having a cylindrical shape of a relatively large diameter, arranged in the sequence from the apparatus interior to the open-air side.

The bearing 423 has an outer race 424 attached to the inner periphery of the shaft hole 402 of the housing 401 (inner periphery of the large-diameter hole 409); an inner race 425 attached to the outer periphery of the shaft 403 and a rotating members 426 such as balls, in a desired number, rotatably provided between the both races 424 and 425, and is provided to support rotation of the shaft 403. The sealing apparatus is attached to the apparatus interior side of the bearing 423.

The sealing apparatus has a reinforcing ring 411 made of a rigid material fixed to a housing 401, provided with a cylindrical portion 412; a stationary sealing portion 418 made of a rubber-like elastic material for sealing the space between the reinforcing ring 411 and the inner periphery of the housing 401, attached to the reinforcing ring 411; and a sealing lip 419 made of a rubber like-elastic material sliding in close contact with the shaft 403, supported by the reinforcing ring 411.

The reinforcing ring 411 is a metal ring made from a metal plate formed into an L-shaped cross-section, attached to the inner periphery of the seal attachment hole 407 of the shaft hole 402 of the housing 401 via a stationary sealing portion 418 made of a rubber-like elastic material. The reinforcing ring 411 has substantially a cylindrical portion 412 having the stationary sealing portion 418 attached to the outer periphery thereof; an engagement area expanding section 413 which is continuous to an open-air side end of the cylindrical portion 412, has a larger diameter than the cylindrical portion 412, and is arranged near the inner periphery of the seal attachment hole 407 of the housing 401, for expanding the engagement area with an outer race of a bearing; and an inward flange portion 411 extending from the engagement area expanding section 413 radially inward. These components are integrally formed in this order.

A tapered portion 415 continuous to the cylindrical portion 412, a cylindrical portion 416, and a bend 417 continuous to the inward flange portion 414 are formed in this order integrally with the engagement area expanding section 413. The cylindrical portion 416 has the largest diameter and is continuous to the cylindrical portion 412 via the tapered portion 415 of which the diameter is reduced from the apparatus interior side (sealing liquid side) end of the cylindrical portion 416 toward the sealing liquid side. The open-air side end of the cylindrical portion 416 is continuous to the inward flange portion 414 via the bend 417 acutely bending radially inward.

The engagement area expanding section 413 is mostly located in the seal attachment hole 407 of the housing, and is formed by extending, bulging or bending the open-air end forming a part of the outer periphery of the reinforcing ring 411 radially outward, i.e., to the inner periphery side of the seal attachment hole 407 of the housing 401. The maximum outside diameter is larger than the outside diameter of the cylindrical portion 412, and slightly smaller than the inside diameter of the seal attachment hole 407. It is sufficiently larger than the inside diameter of the outer race of the bearing 423 so as to expand the axial engagement area with the outer race.

The outside diameter of the cylindrical portion 412 is smaller than the inside diameter of the seal attachment hole 407. The maximum outside diameter of the engagement area expanding section 413 is very slightly smaller than the inside diameter of the seal attachment hole 407.

A part of the engagement area expanding section 413, i.e., the angle between the cylindrical portion 416 and the bend 417 takes the form of a projection 428 projecting from the inward flange portion 414 to the open-air side. This projection 428 is arranged so as to project from the step end face 427 to the open-air side, and comes into contact with the apparatus interior side end face of the outer race 424. An axial gap having a prescribed size is provided between the apparatus interior side end face and the step end face 427 of the outer race 424.

The stationary sealing portion (also called the rubber portion) 418 made of a rubber-like elastic material is vulcanization-bonded to the outer peripheral surface of the cylindrical portion 412. A sealing lip 419 made of a rubber-like elastic material (also called the rubber lip) is vulcanization-bonded on the inner periphery sides of the cylindrical portion 412 of the engagement area expanding section 413, on the apparatus interior side of the flange portion 414. The stationary sealing portion 418 and the sealing lip 419 are connected to each other via a connecting portion 420 positioned at an end of the cylindrical portion 412 and integrally vulcanization-formed. The sealing lip 419 is of the double type having a first and a second seal ends 429 and 430. It has a garter spring 431 attached to the outer periphery thereof. A dust lip 432 made of a rubber-like elastic material is integrally formed toward the open-air side at the radial inside end of the flange portion 414 on the back side of the sealing lip 419, and slides in close contact with the shaft 403. In the lip-type seal, all parts and components form an annular endless circuit.

The above-mentioned sealing apparatus is attached onto the inner periphery of the shaft hole 402 of the housing 401 as shown in FIG. 10, and is to seal the sealing liquid (not shown) at the top in the drawing. The configuration described above brings about the following advantages.

More specifically, because the engagement area expanding section 413 extending to the housing 401 side and substantially expanding the axial engagement area with the outer race 424 of the bearing 423 is integrally provided as a part thereof, the reinforcing:ring 411 is firmly held by the outer race 424, and the outer race 424 is never moved by pressing. As a result, the lip-type seal never inclines, thus permitting full display of an excellent sealing property for a long period of time. The reinforcing ring 411 including the engagement area expanding section 413 directly engages with the outer race, whereas engagement may be made via a buffer material (not shown) such as a rubber film.

Fifth Embodiment

Figure 11:
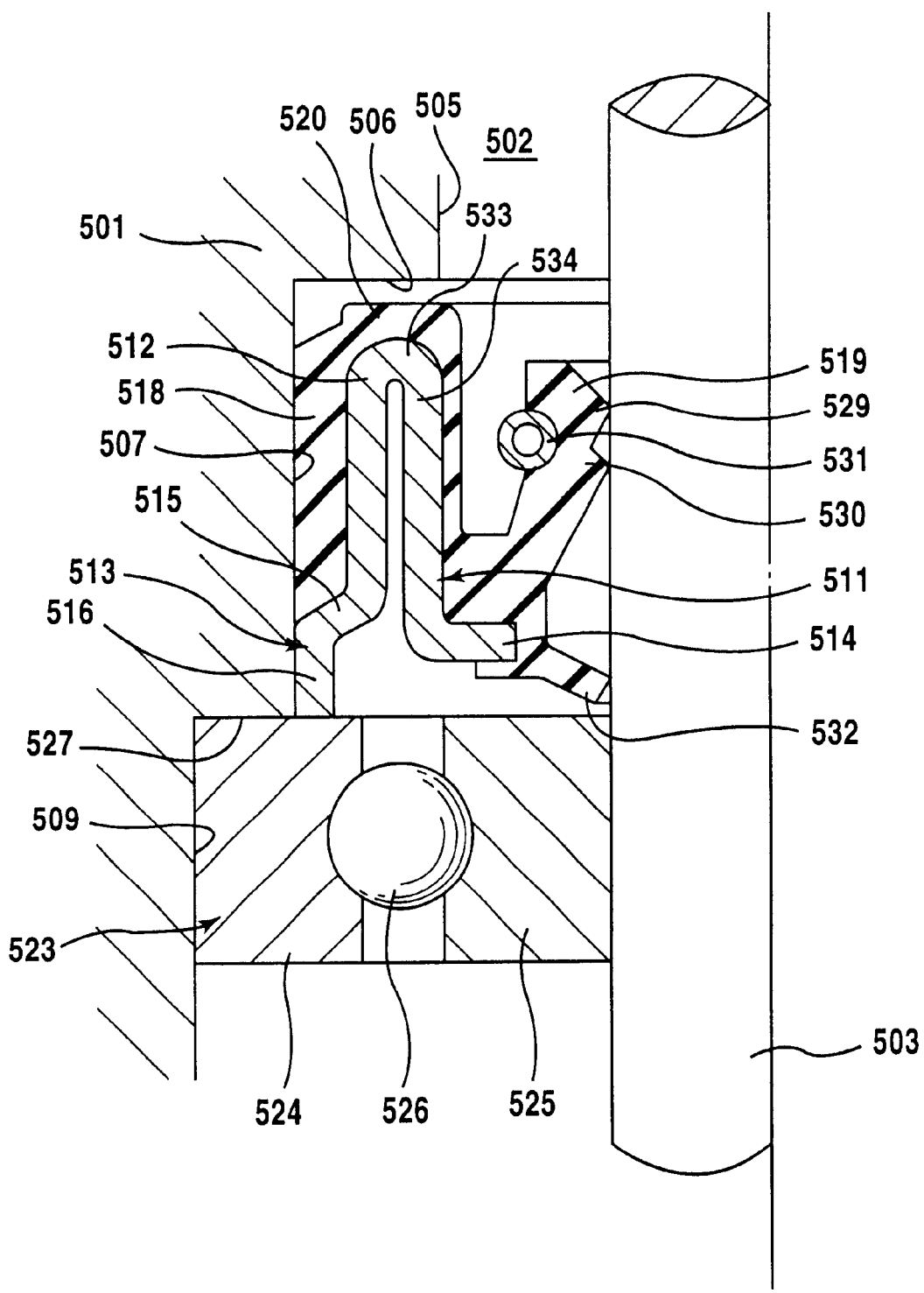
FIG. 11 is a half-cut sectional view illustrating the state of attachment of a sealing apparatus of a fifth embodiment of the invention.

As shown in FIG. 11, a lip-type seal of the fifth embodiment is an oscillating seal for power steering. The seal of this embodiment is inserted into a shaft hole 502 of a housing 501 serving as one of relatively moving members from the open-air side thereof (also called the anti-sealing liquid side; top and bottom sides in FIG. 11), attached to the inner periphery of the shaft hole 502, slides in close contact with the peripheral surface of a shaft 503 serving as the other of the relatively moving members, prevents axial coming-off, holds or retains by means of an outer race 524 of a bearing 523 serving as a stop functional member. In FIG. 11, the upper side of the sealing apparatus is the sealing liquid side (also called the internal liquid side, or the apparatus interior side) and the lower side is the open-air side.

The inner periphery of the shaft hole 502 of the housing has a stepped cylindrical shape of which the diameter becomes smaller from the open-air side toward the apparatus interior side, and has a small-diameter hole 505 located deep in the apparatus and presenting a cylindrical shape of a relatively small diameter; a step end face 506 extending from the open-air side end edge of the small-diameter hole 505 radially outward; a cylindrical seal attachment hole 507, housing a larger diameter than the small-diameter hole, and extending from the outside-diameter end of the stepped end face 506 axially toward the open-air side, to which the lip type seal is attached and fixed; a stepped end face 527 extending from the open-air side edge of the seal attachment hole 507 radially outward; and a bearing attachment hole 509 which extends further from the large-diameter end of the stepped end face 527 axially to the open-air side, and having a cylindrical shape of a relatively large diameter, arranged in the sequence from the apparatus interior to the open-air side.

The bearing 523 has an outer race 524 attached to the inner periphery of the bearing attachment hole 509 of the housing 501; an inner race 525 attached to the outer periphery of the shaft 503 and a rotating members 526 such as balls, in a desired number, rotatably provided between the both races 524 and 525, and is provided to support rotation of the shaft 503. The lip-type seal is attached to the apparatus interior side of the bearing 523.

The sealing apparatus has a reinforcing ring 511 made of a rigid material fixed to a housing 501, provided with a cylindrical portion 512; a stationary sealing portion 518 made of a rubber-like elastic material for sealing the space between the reinforcing ring 511 and the inner periphery of the housing 501, attached to the reinforcing ring 511; and a sealing lip 519 made of a rubber-like elastic material sliding in close contact with the shaft 503, supported by the reinforcing ring 511.

The reinforcing ring 511 is a metal ring such as a metal plate attached to the inner periphery of the shaft hole 502 of the housing 501 (inner periphery of the seal attachment hole 507) via the stationary sealing portion 518 made of a rubber-like elastic material. The reinforcing ring 511 has a first cylindrical portion 512 to which the stationary sealing portion 518 made of a rubber-like elastic material is attached; the engagement area expanding section 513 which is continuous to the open-air side end of the first cylindrical portion 512, has a larger diameter, and is arranged near the inner periphery of the seal attachment hole 507 of the housing 501; a reversal portion 533 where the sealing liquid side end of the first cylindrical portion 512 is reversed in to a U-shaped cross-section; a second cylindrical portion 534 extending axially toward the open-air side via the reversal portion 533 with a prescribed distance from the cylindrical portion 512; and an inward flange portion 514 extending from the open-air side end of the second cylindrical portion 534 radially inward. These components are integrally formed in this order. The maximum diameter of the engagement area expanding section 513 is substantially equal to the bore diameter of the seal attachment hole 507, and larger than the inside diameter of the outer race 524.

The engagement area expanding section 513 has a cylindrical portion 516 having a larger diameter than the first cylindrical portion 512; and a tapered portion 515 continuous to the above-mentioned first cylindrical portion 512, of which the diameter gradually becomes smaller from the sealing liquid side end of the cylindrical portion 516 toward the sealing liquid side. The engagement area expanding section 513 is formed by extending, bulging or bending the open-air end forming a part of the outer periphery of the reinforcing ring 511 radially outward, i.e., to the inner periphery side of the seal attachment hole 507 of the housing 501. The maximum outside diameter is larger than the outside diameter of the first cylindrical portion 512, and substantially equal to the inside diameter of the seal attachment hole 507. It is sufficiently larger than the inside diameter of the outer race 524 of the bearing 523 so as to expand the axial engagement area with the outer race 524.

The outside diameter of the first cylindrical portion 512 is smaller than the inside diameter of the seal attachment hole 507. The maximum outside diameter of the engagement area expanding section 513 is substantially equal to the inside diameter of the seal attachment hole 507. The inside diameter of the cylindrical portion 516 of the engagement area expanding section 513 is larger than the inside diameter of the outer race 524.

The open-air end face of the engagement area expanding section 513 is arranged substantially flush with the stepped end face 527, and is in contact with the apparatus interior side end face of the outer race 524. The apparatus interior side end face of the outer race 524 is in contact with the stepped end face 527. A radial gap of a prescribed size is provided between the first cylindrical portion 512 and the second cylindrical portion 534.

The stationary sealing portion (also called the rubber portion) 518 made of a rubber-like elastic material is vulcanization-bonded to the outer peripheral surface of the first cylindrical portion 512. A sealing lip 519 made of a rubber-like elastic material (also called the rubber lip) is vulcanization-bonded on the inner periphery sides of the second cylindrical portion 534, on the apparatus interior side of the flange portion 514. The stationary sealing portion 518 and the sealing lip 519 are connected to each other via a connecting portion 520 positioned at an end of the reversal portion 533 and integrally vulcanization-formed.

The sealing lip 519 is of the double type having a first and a second seal ends 529 and 530. It has a garter spring 531 attached to the outer periphery thereof.

A dust lip 532 made of a rubber-like elastic material is integrally formed toward the open-air side at the radial inside end of the flange portion 514 on the back side of the sealing lip 519, and slides in close contact with the shaft 503. In the lip-type seal, all parts and components form an annular endless circuit.

The above-mentioned sealing apparatus is attached onto the inner periphery of the shaft hole 502 of the housing 501 as shown in the drawing, and is to seal the sealing liquid (not shown) at the top in the drawing. The configuration described above brings about the following advantages.

More specifically, because the engagement area expanding section 513 extending to the housing 501 side and substantially expanding the axial engagement area with the outer race 524 of the bearing 523 is integrally provided as a part thereof, the reinforcing ring 511 is firmly held by the outer race 524, and the outer race 524 is never moved by pressing. As a result, the lip-type seal never inclines, thus permitting full display of an excellent sealing property for a long period of time. The reinforcing ring 511 including the engagement area expanding section 513 directly engages with the outer race, whereas engagement may be made via a buffer material (not shown) such as a rubber film.

When the first cylindrical portion 512 and the second cylindrical portion 534 are connected via the reversal portion 533 described above, the first cylindrical portion 512 has radial elasticity. Setting of a diameter of the engagement area expanding section 513 equal to the bore diameter of the seal attachment hole 507 causes no trouble in attachment, and the engagement area in the seal attachment hole 507 can be expanded to the maximum extent.

Sixth Embodiment

Figure 12:
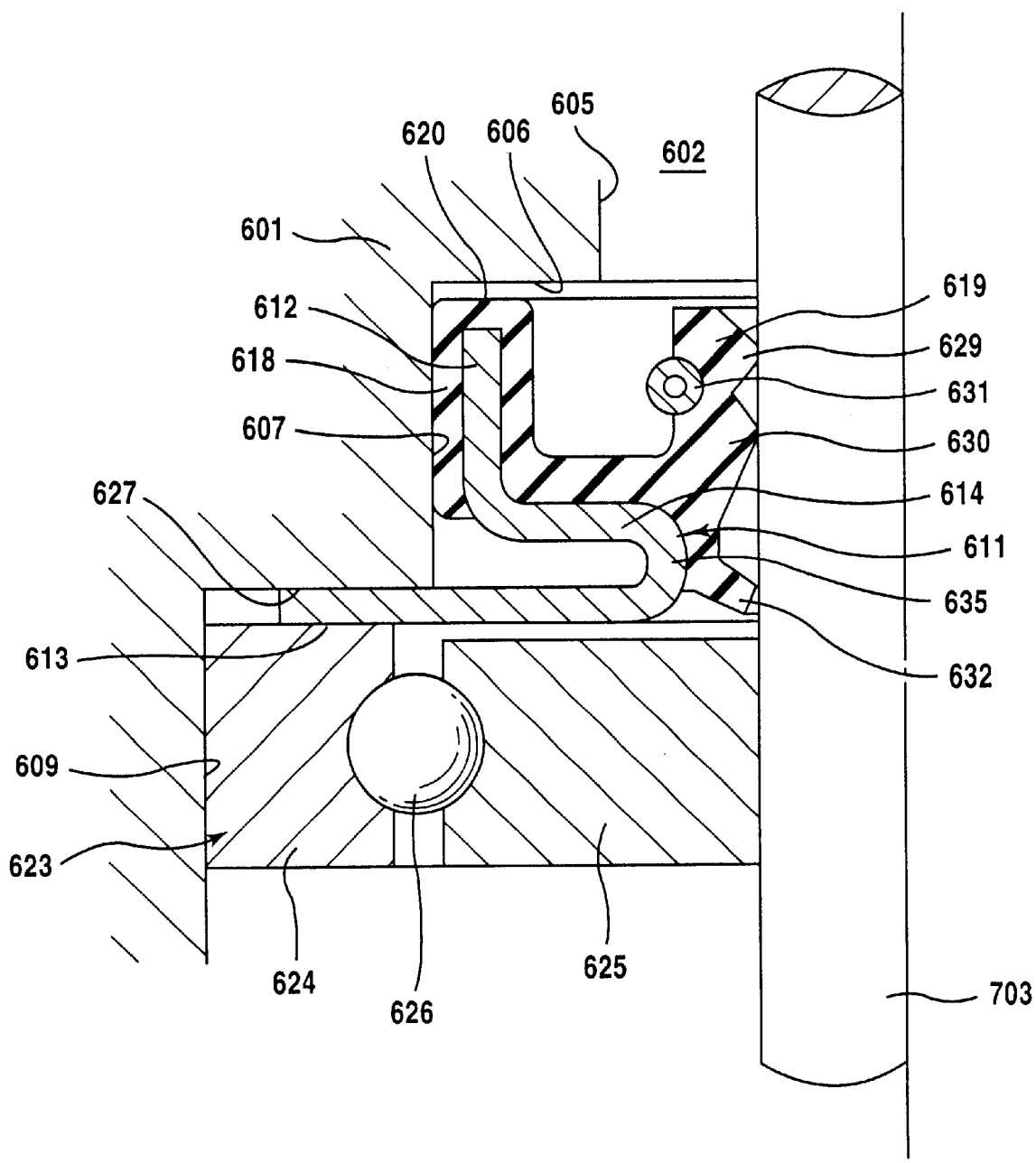
FIG. 12 is a half-cut sectional view illustrating the state of attachment of a sealing apparatus of a sixth embodiment of the invention.

FIG. 12 illustrates a sealing apparatus of a sixth embodiment of the invention.

A lip-type seal of the sixth embodiment is an oscillating seal for power steering. The seal of this embodiment is inserted into a shaft hole 602 of a housing 601 serving as one of relatively moving members from the open-air side thereof (also called the anti-sealing liquid side; top and bottom sides in FIG. 12), attached to the inner periphery of the shaft hole 602, slides in close contact with the peripheral surface of a shaft 603 serving as the other of the relatively moving members, prevents axial coming-off holds or retains by means of an outer race 624 of the bearing 623 serving as a stop functional member. In FIG. 12, the upper side of the sealing apparatus is the sealing liquid side (also called the internal liquid side, or the apparatus interior side) and the lower side is the open-air side.

The inner periphery of the shaft hole 602 of the housing has a stepped cylindrical shape of which the diameter becomes smaller from the open-air side toward the apparatus interior side, and has a small-diameter hole 605 located deep in the apparatus and presenting a cylindrical shape of a relatively small diameter; a step end face 606 extending from the open-air side end edge of the small-diameter hole 605 radially outward; a cylindrical seal attachment hole 607, having a larger diameter than the small-diameter hole, and extending from the outside-diameter end of the stepped end face 606 axially toward the open-air side, to which the lip type seal is attached and fixed; a stepped end face 627 extending from the open-air side end of the seal attachment hole 607 radially outward; and a bearing attachment hole 609 which extends further from the large-diameter end of the stepped end face 627 axially to the open-air side, and having a cylindrical shape of a relatively large diameter, arranged in the sequence from the apparatus interior to the open-air side.

The bearing 623 has an outer race 624 attached to the inner periphery of the bearing attachment hole 602 of the housing 601; an inner race 625 attached to the outer periphery of the shaft 603 and a rotating members 626 such as balls, in a desired number, rotatably provided between the both races 624 and 625, and is provided to support rotation of the shaft 603. The lip-type seal is attached to the apparatus interior side of the bearing 623.

The sealing apparatus has a reinforcing ring 611 made of a rigid material fixed to a housing 601, provided with a cylindrical portion 612; a stationary sealing portion 618 made of a rubber-like elastic material for sealing the space between the reinforcing ring 611 and the inner periphery of the housing 601 attached to the reinforcing ring 611; and a sealing lip 619 made of a rubber-like elastic material sliding in close contact with the shaft 603, supported by the reinforcing ring 611.

The reinforcing ring 611 is a metal ring such as a metal plate attached to the inner periphery of the shaft hole 602 of the housing 601 (inner periphery of the seal attachment hole 607) via the stationary sealing portion 618 made of a rubber-like elastic material. The reinforcing ring 611 has a cylindrical portion 612 to which the stationary sealing portion 618 made of rubber-like elastic material is attached; an inward flange portion 614 extending from the open-air side end of the cylindrical portion 612 radially inward; a reversal portion 635 where the inside-diameter end of the inward flange portion 614 is reversed in to a U-shaped cross-section; and an engagement area expanding section 613 having an outward flange shape or a collar shape, extending radially outward via the reversal portion 635. There components are integrally formed in this order.

The engagement area expanding section 613 is provided by extending, bulging or bending a part of the reinforcing ring 611, i.e., the open-air side end radially outward, i.e., toward the housing side 601 into a flange shape. The maximum diameter thereof is larger than the outside diameter of the cylindrical portion 612 and the inside diameter of the seal attachment hole 604, and sufficiently larger than the inside diameter of the outer race 624 of the bearing 623 so as to expand the axial engagement area with the outer race 624.

The outside diameter of the cylindrical portion 612 is smaller than the inside diameter of the seal attachment hole 607. The maximum outside diameter of the engagement area expanding section 613 is larger than the inside diameter of the seal attachment hole 607. The outer periphery edge of the engagement area expanding section 613 is held between the apparatus interior side end face and the stepped end face 627 of the outer race 624.

An axial gap of a prescribed size is provided between the open-air side end face of the engagement area expanding section and the apparatus interior side end face of the inner race 625 of the bearing 623 with a view to preventing interference of the both faces. An axial gap of a prescribed size is also provided between the apparatus interior side end face of the engagement area expanding section 613 and the open-air side end face of the flange portion 614.

As described above, the stationary sealing portion 618 (also called portion) made of a rubber-like elastic material is vulcanization-bonded to the outer peripheral surface of the cylindrical portion 612. A sealing lip 619 (also called the rubber lip) made of a rubber-like elastic material is vulcanization-bonded to the inner periphery of the cylindrical portion 612 on the apparatus interior side of the flange portion 614. The stationary sealing portion 618 and the sealing lip 619 are connected to each other via a connecting portion 620 located at an end of the cylindrical portion 612, and are integrally vulcanization-formed. The sealing lip 619 is of the double type having a first and a second sealing ends 629 and 630, and a spring ring 631 such as a garter spring is attached to the outer periphery thereof.

A dust lip 632 made of a rubber-like elastic material is integrally formed toward the open-air side at the radial inside end of the reversal portion 635 on the back side of the sealing lip 619, and slides in close contact with the shaft 603. In the lip-type seal, all parts and components form an annular endless circuit.

The above-mentioned sealing apparatus is attached onto the inner periphery of the shaft hole 602 of the housing 601 as shown in the drawing, and is to seal the sealing liquid (not shown) at the top in the drawing. The configuration described above brings about the following advantages.

More specifically, because the engagement area expanding section 613 extending to the housing 601 side, substantially expanding the axial engagement area with the outer race 624 of the bearing 623, and held and supported between the outer race 624 and the stepped end face 627 of the housing 601 is integrally provided as a part of the reinforcing ring 611, the reinforcing ring 611 is firmly held by the outer race 624, and the outer race 624 is never moved by pressing.

As a result, the lip seal never inclines, thus permitting full display of an excellent sealing property for a long period of time. The reinforcing ring 611 including the engagement area expanding section 613 directly engages with the outer race, whereas engagement may be made via a buffer material (not shown) such as a rubber film.

Since the engagement area expanding section 613 is held between the stepped end face 627 and the outer race 624 by face contact, when there is a deviation in the degree of right angles between the engagement area expanding section 613 and the cylindrical portion 612 to be covered with the stationary sealing portion 614 the stationary sealing portion 18 may incline without a reversal portion 635. The deviation is however absorbed by the reversal portion 635, and it is possible to attach the stationary sealing portion 18 axially in a normal state.

Seventh Embodiment

Figure 13:
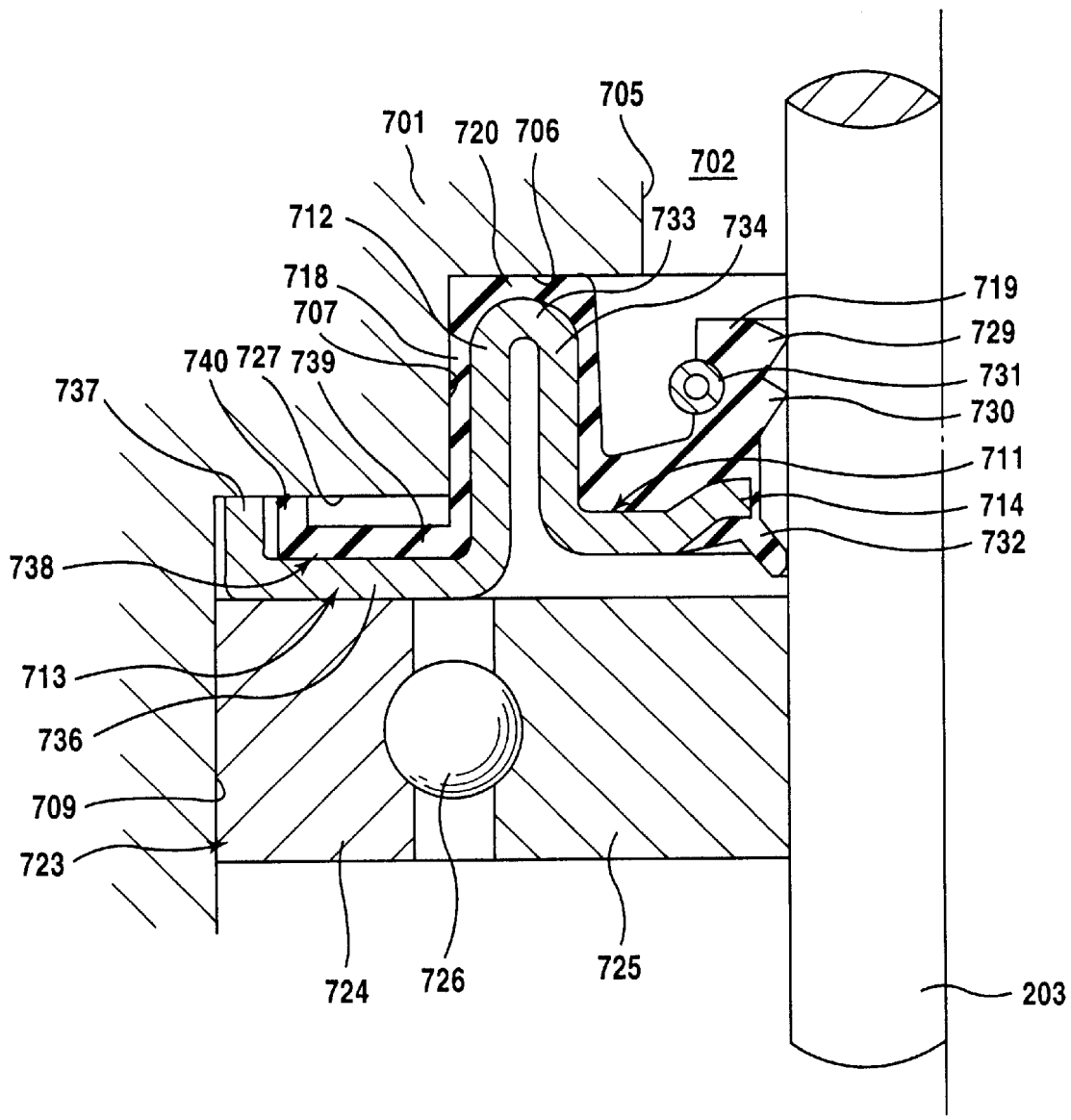
FIG. 13 is a half-cut sectional view illustrating the state of attachment of a sealing apparatus of a seventh embodiment of the invention.

As shown in FIG. 13, the lip-type seal of the seventh embodiment is a an oscillating seal for power steering. The seal of this embodiment is inserted into a shaft hole 702 of a housing 701 serving as one of relatively moving members from the open-air side thereof (also called the anti-sealing liquid side; top and bottom sides in FIG. 13), attached to the inner periphery of the shaft hole 702, sides in close contact with the peripheral surface of a shaft 703 serving as the other of the relatively moving members, prevents axial coming-off, holds or retain by means of an outer race 724 of a bearing 723 serving as a stop functional member. In FIG. 13, the upper side of the sealing apparatus is the sealing liquid side (also called the internal liquid side, or the apparatus interior side) and the lower side is the open-air side.

The inner periphery of the shaft hole 702 of the housing 701 has a stepped cylindrical shape of which the diameter becomes smaller from the open-air side toward the apparatus interior side, and has a small-diameter hole 705 located deep in the apparatus and presenting a cylindrical shape of a relatively small diameter; a step end face 706 extending from the open-air side end edge of the small-diameter hole 705 radially outward; a cylindrical seal attachment hole 707, housing a larger diameter than the small-diameter hole, and extending from the outside-diameter end of the stepped end face 706 axially toward the open-air side, to which the lip type seal is attached and fixed; a stepped end face 727 extending from the open-air side edge of the seal attachment hole 707 radially outward; and a bearing attachment hole 709 which extends further from the large-diameter end of the stepped end face 727 axially to the open-air side, and having a cylindrical shape of a relatively large diameter, arranged in the sequence from the apparatus interior to the open-air side.

The bearing 723 has an outer race 724 attached to the inner periphery of the bearing attachment hole 709 of the housing 701; an inner race 725 attached to the outer periphery of the shaft 703 and a rotating members 726 such as balls, in a desired number, rotatably provided between the both races 724 and 725, and is provided to support rotation of the shaft 703. The lip-type seal is attached to the apparatus interior side of the bearing 723.

The sealing apparatus has a reinforcing ring 711 made of a rigid material fixed to a housing 701, provided with a cylindrical portion 712; a stationary sealing portion 718 made of a rubber-like elastic material for sealing the space between the reinforcing ring 711 and the inner periphery of the housing 701, attached to the reinforcing ring 711; and a sealing lip 719 made of a rubber-like elastic material sliding in close contact with the shaft 703, supported by the reinforcing ring 711.

The reinforcing ring 711 is a metal ring such as a metal plate attached to the inner periphery of the shaft hole 702 of the housing 701 (inner periphery of the seal attachment hole 707) via the stationary sealing portion 718 made of a rubber-like elastic material. The reinforcing ring 711 has a first cylindrical portion 712 to which the stationary sealing portion 718 made of a rubber-like elastic material is attached; the engagement area expanding section 713 which extends radially outward from the open-air side end of the first cylindrical portion 712 into a flange shape or collar shape; a reversal portion 733 where the sealing liquid side end of the first cylindrical portion 712 is reversed axially toward the open-air side into a U-shaped cross-section; a second cylindrical portion 734 extending axially toward the open-air side via the reversal portion 733 with a prescribed distance from the cylindrical portion 712; and an inward flange portion 714 extending from the open-air side end of the second cylindrical portion 734 radially inward. The maximum diameter of the engagement area expanding section 713 is larger than the bore diameter of the seal attachment hole 707, and larger than the inside diameter of the outer race 724 of the bearing 723. The outside-diameter side portion of the engagement area expanding section 713 is held between the sealing liquid side surface of the outer race 724 and the stepped end face on the boundary between the seal attachment hole 707 and the bearing attachment hole 709.

An outward flange portion 736 continuous to the cylindrical portion 712 and a cylindrical portion (also called the annular convex portion) 737 in face-contact with the stepped end face 727, bent from the outer peripheral end of the flange portion 736 toward the apparatus interior side are integrally formed in this order with the engagement area expanding section 713. The engagement area expanding section 713 is provided by extending, bulging or bending a part of the reinforcing ring 711, i.e., the open-air side end of the cylindrical portion 712 radially outward, i.e., toward the housing side 701 into a flange shape. The maximum diameter thereof is larger than the outside diameter of the cylindrical portion 712 and the inside diameter of the seal attachment hole 704, and sufficiently larger than the inside diameter of the outer race 724 of the bearing 723 so as to expand the axial engagement area with the outer race 724.

The outside diameter of the cylindrical portion 712 is smaller than the inside diameter of the seal attachment hole 707. The maximum outside diameter of the engagement area expanding section 713 is larger than the inside diameter of the seal attachment hole 707. The outer periphery edge of the engagement area expanding section 713 is held between the apparatus interior side end face and the stepped end face 727 of the outer race 724.

The engagement area expanding section 713 and the inner race 725 of the bearing 723 are not in contact with each other with a view to preventing interference of the both faces. An axial gap of a prescribed size is also provided between the cylindrical portion 712 and the second cylindrical portion 734.

The stationary sealing portion made of a rubber-like elastic material (also called the first stationary sealing portion or the rubber portion) 718 is vulcanization-bonded to the outer periphery surface of the cylindrical portion 712. A sealing lip (also called the rubber lip) 719 made of a rubber-like elastic material is vulcanization-bonded to the inner peripheral side of the second cylindrical portion 734 on the apparatus interior side of the flange portion 714. A second stationary sealing portion 738 made of rubber-like elastic material is vulcanization-bonded to the apparatus interior side end face of the engagement area expanding section 713. The stationary sealing portion 718 and the sealing lip 719 are connected to each other via a connecting portion 720 located at an end of the reversal portion 733. The stationary sealing portion 718 and the second stationary sealing portion 738 directly connected to each other, and these are integrally vulcanization-formed. The sealing lip 719 is of the double type having a first and a second seal ends 729 and 730, and a spring ring 731 such as a garter spring is attached to the outer periphery thereof. A dust lip 732 made of a rubber-like elastic material is integrally toward the open-air side with the radial inner end of the flange portion 714 on the back side of the sealing lip 719, and slides in close contact with the peripheral surface of the shaft 703. The second stationary sealing portion 738 has a flange portion 739 vulcanization-bonded to the apparatus interior side end face of the flange portion 736 of the engagement area expanding section 713 and continuous to the stationary sealing portion 718, and a cylindrical portion (also called the annular convex portion or the annular seal projection) 740 integrally formed from the outer periphery end of the flange portion 739 toward the apparatus interior side and in end-face contact end face 727. In this lip-type seal, all the parts and components form an annular endless circuit.

The above-mentioned sealing apparatus is attached onto the inner periphery of the shaft hole 702 of the housing 701 as shown in the drawing, and is to seal the sealing liquid (not shown) at the top in the drawing. The configuration described above brings about the following advantages.

More specifically, because the engagement area expanding section 713 extending to the housing 701 side, substantially expanding the axial engagement area with the outer race 724 of the bearing 723, and held and supported between the outer race 724 and the stepped end face 727 of the housing 701 is integrally provided as a part of the reinforcing ring 711, the reinforcing ring 711 is firmly held by the outer race 724, and the outer race 724 is never moved by pressing. As a result, the lip seal never inclines, thus permitting full display of an excellent sealing property for a long period of time. Because the second stationary sealing portion 738 in end-face contact with the stepped end face 727, being held between the outer race 724 and the stepped end face 727, sealing property is high on the stationary side. While the reinforcing ring 711 including the engagement area expanding section 713 directly engages with the outer race 724, engagement may be made via a buffer material (not shown) such as a rubber film.

There various other embodiments of bending of the reinforcing ring 711 apart from those mentioned above. Seal durability and sealing property can be improved by maximizing the ring outside diameter within the allowable limits, forming the ring into a flange or collar shape, holding the housing and the bearing in between, forming the ring into a collar shape, or imparting seal property by crushing.

The engagement area expanding section 713 is held between the stepped end face 727 and the outer race 724 in the present embodiment as in the sixth embodiment. Unlike the sixth embodiment, however, contact is partial under the effect of the cylindrical portion 737 at the outside-diameter end. Even there is a variation in the degree of right angles between the engagement area expanding section 713 and the first cylindrical portion 712, therefore, the stationary sealing portion 718 never inclines, and it is possible to attach the stationary sealing portion 718 axially in a normal state. The first cylindrical portion 712 is connected to the second cylindrical portion 734 via the reversal portion 733, and the first cylindrical portion 712 is radially elastic. It is therefore possible to bring the stationary sealing portion 718 into close contact certainly with the inner periphery of the seal attachment hole 707.

What is claimed is:

1. A sealing apparatus of a lip-type seal structure, which is fixed to one of two relatively movable members and is slidable in tight contact to another one of two movable members, comprising:

a reinforcing ring, made of a rigid material, having a cylindrical portion, and fixed to said one of two movable members;

a stationary sealing portion mounted to the reinforcing ring so as to seal a gap between the reinforcing ring and said one of two movable members;

a sealing lip supported by the reinforcing ring to be slidable in contact to said another one of two movable members;

a stopper member fixed to said one of two movable members for preventing the reinforcing ring from coming off through axial engagement with the stopper member, the cylindrical portion of said reinforcing ring expanding into an engagement area of a larger diameter near said one of two movable members thus increasing an engagement area with said stopper member.

2. A sealing apparatus according to claim 1, wherein said stopper member is a stop ring to be engaged with an engagement groove formed to an open-air side end portion of a seal fitting hole on an inner periphery of a shaft hole of a housing as said one of movable members, and said reinforcing ring comprises the cylindrical portion to which the stationary sealing portion made of a rubber-like elastic material is applied, the engagement area of said reinforcing ring continuous to the open-air side end portion of said cylindrical portion, having a diameter larger than that of the cylindrical portion and being arranged near the inner periphery of the shaft hole, and an inward flange portion extending from the engagement area of said reinforcing ring in a radially inward direction, said engagement area of said reinforcing ring being positioned within the seal fitting hole and having a largest outer diameter smaller than a diameter of the seal fitting hole and larger than an inner diameter of the stop ring.

3. A sealing apparatus according to claim 2, wherein a large-diameter hole having a diameter larger than that of the seal fitting hole is formed on the inner periphery of the shaft hole of the housing on the open-air side of the seal fitting hole, a tapered hole which gradually diverges toward the open-air side and is continuous to the large-diameter hole is formed at the open-air side end portion of the seal fitting hole, and the engagement groove for the stop ring is formed at a boundary position between the open-air side end portion of the tapered hole and the large-diameter hole.

4. A sealing apparatus according to claim 2, wherein said sealing lip is composed of a first sealing lip section which is provided on a first sealing member formed of a rubber-like elastic material to be integral with the reinforcing ring and a second sealing lip section which is provided on a second sealing member made of a resin which is assembled between the first sealing member and the inward flange portion of the reinforcing ring so as to support the open-air side surface of the first sealing lip section, said first sealing member being connected to the inner periphery of the cylindrical portion of the reinforcing ring and has a main body opposing to the inward flange portion, said first sealing lip section extending from the main body axially toward the sealing liquid side and having a lip leading end portion in contact to an outer periphery of the shaft in a sealed manner, said second sealing member having a flange portion held between a radial portion of the first sealing member and the inward flange portion of the reinforcing ring, and said second sealing lip section being inserted from the inner-diameter end portion of the flange portion into an annular space between the first sealing lip section and the outer peripheral surface of the shaft through a bent portion and having an inner periphery to be slidable in contact to the outer periphery of the shaft.

* * * * *